(12) United States Patent
Wiggeshoff

(10) Patent No.: US 11,679,328 B2
(45) Date of Patent: Jun. 20, 2023

(54) RECOMMENDING GAME STREAMS FOR SPECTATING BASED ON RECOGNIZED OR PREDICTED GAMING ACTIVITY

(71) Applicant: Sony Interactive Entertainment Inc., Tokyo (JP)

(72) Inventor: Elke Wiggeshoff, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/223,013

(22) Filed: Apr. 6, 2021

(65) Prior Publication Data
US 2022/0203228 A1    Jun. 30, 2022

Related U.S. Application Data

(60) Provisional application No. 63/132,446, filed on Dec. 30, 2020.

(51) Int. Cl.
*A63F 13/355* (2014.01)
*A63F 13/79* (2014.01)
(Continued)

(52) U.S. Cl.
CPC .......... *A63F 13/355* (2014.09); *A63F 13/79* (2014.09); *A63F 13/86* (2014.09); *G06N 20/00* (2019.01);
(Continued)

(58) Field of Classification Search
CPC ........ A63F 13/355; A63F 13/79; A63F 13/86; G06N 20/00
See application file for complete search history.

(56) References Cited

U.S. PATENT DOCUMENTS 10,864,447 B1 * 12/2020 Willette .................. A63F 13/86
10,974,147 B1 *  4/2021 Sarria, Jr. ........... A63F 13/5252
(Continued)

FOREIGN PATENT DOCUMENTS

EP    3717084 A2    10/2020

OTHER PUBLICATIONS

PCT App. No. PCT/US2021/063854, Search Report, ISA210, dated Apr. 7, 2022.

*Primary Examiner* — William H McCulloch, Jr.
*Assistant Examiner* — Ankit B Doshi
(74) *Attorney, Agent, or Firm* — Penilla IP, APC

(57) ABSTRACT

In some implementations, a method is provided, performed by at least one server computer, for providing spectating of gameplay of a video game, including: receiving a plurality of game streams, each game stream being generated from an executing session of a video game; analyzing each game stream, to recognize gameplay activity depicted in each game stream; obtaining spectating preferences of a user; determining a prioritization of the plurality of game streams based on the recognized gameplay activity and the spectating preferences of the user; providing, over a network via a client device operated by the user, a recommendation of at least some of the game streams for spectating based on the determined prioritization; responsive to receiving, over the network from the client device, a selection of one of the recommended game streams, then providing, over the network to the client device, the selected game stream for spectating by the user.

19 Claims, 13 Drawing Sheets

(51) Int. Cl.
  *G06N 20/00* (2019.01)
  *A63F 13/86* (2014.01)
(52) U.S. Cl.
  CPC ... *A63F 2300/572* (2013.01); *A63F 2300/577* (2013.01)

(56) References Cited

U.S. PATENT DOCUMENTS

| | | | | |
|---|---|---|---|---|
| 2016/0381109 A1* | 12/2016 | Barnett | ........... | H04W 4/08 |
| | | | | 709/231 |
| 2017/0001111 A1* | 1/2017 | Willette | ........... | A63F 13/49 |
| 2017/0001112 A1* | 1/2017 | Gilmore | ........... | A63F 13/30 |
| 2017/0001122 A1* | 1/2017 | Leung | ........... | A63F 13/355 |
| 2017/0003740 A1* | 1/2017 | Verfaillie | ........... | A63F 13/87 |
| 2017/0006074 A1* | 1/2017 | Oates, III | ........... | H04N 21/472 |
| 2017/0228600 A1 | 8/2017 | Syed et al. | | |
| 2017/0246544 A1* | 8/2017 | Agarwal | ........... | A63F 13/63 |
| 2019/0321725 A1 | 10/2019 | Zimring et al. | | |
| 2019/0335228 A1* | 10/2019 | Sprenger | ........... | H04N 21/4532 |
| 2020/0043287 A1* | 2/2020 | Zhang | ........... | H04N 21/251 |
| 2020/0147487 A1 | 5/2020 | Mahlmeister et al. | | |
| 2020/0147489 A1 | 5/2020 | Mahlmeister et al. | | |
| 2020/0147496 A1 | 5/2020 | Mahlmeister et al. | | |
| 2020/0147497 A1 | 5/2020 | Mahlmeister et al. | | |
| 2020/0147499 A1 | 5/2020 | Mahlmeister et al. | | |
| 2020/0147500 A1 | 5/2020 | Mahlmeister et al. | | |
| 2020/0147501 A1 | 5/2020 | Mahlmeister et al. | | |
| 2020/0188784 A1 | 6/2020 | Woidan et al. | | |
| 2020/0289943 A1 | 9/2020 | Rico et al. | | |
| 2021/0220733 A1 | 7/2021 | Zimring et al. | | |
| 2021/0331072 A1* | 10/2021 | Gibbon | ........... | A63F 13/87 |
| 2021/0339146 A1 | 11/2021 | Rico et al. | | |
| 2021/0370186 A1* | 12/2021 | Ye | ........... | G06N 20/00 |
| 2021/0394061 A1 | 12/2021 | Mahlmeister et al. | | |
| 2021/0394073 A1* | 12/2021 | Osman | ........... | A63F 13/355 |

* cited by examiner

RECOMMENDING GAME STREAMS FOR SPECTATING BASED ON RECOGNIZED OR PREDICTED GAMING ACTIVITY

FIELD OF THE DISCLOSURE

Implementations of the present disclosure relate to live spectating of video games, and more specifically to systems and methods for providing spectators with personalized spectating recommendations at opportune times when interesting activity is likely to occur, and providing a helper mode for spectators to assist players in gameplay.

BACKGROUND

Description of the Related Art

The field of video game spectating has witnessed significant growth in recent years. Spectators seek out opportunities to spectate their favorite games and players, for example through online platforms that provide live streaming of game sessions. However, spectators must often commit significant amounts of time to watching segments of gameplay activity which they may not find very interesting. When a spectator joins a given session as a spectator they typically do not know whether they will be joining into an interesting portion of the gameplay at all, or whether anything interesting is likely to occur in the gameplay in the near future.

Further, while a spectator is engaged in observing the activity occurring in one game session, they may miss more interesting activity occurring in another session. And as the number of available video game streams grows, it becomes increasingly difficult for a given spectator to find interesting gameplay to observe.

It is in this context that implementations of the disclosure arise.

SUMMARY OF THE DISCLOSURE

Implementations of the disclosure are drawn to systems and methods for providing live spectating of video games, and more specifically to systems and methods for providing spectators with personalized spectating recommendations at opportune times when interesting activity is likely to occur, and providing a helper mode for spectators to assist players in gameplay.

In some implementations, a method is provided, performed by at least one server computer, for providing spectating of gameplay of a video game, comprising: receiving a plurality of game streams, each game stream being generated from an executing session of a video game; analyzing each game stream, to recognize gameplay activity depicted in each game stream; obtaining spectating preferences of a user; determining a prioritization of the plurality of game streams based on the recognized gameplay activity and the spectating preferences of the user; providing, over a network via a client device operated by the user, a recommendation of at least some of the game streams for spectating based on the determined prioritization; responsive to receiving, over the network from the client device, a selection of one of the recommended game streams, then providing, over the network to the client device, the selected game stream for spectating by the user.

In some implementations, each game stream includes gameplay video or gameplay metadata, generated from the executing session of the video game.

In some implementations, analyzing each game stream includes applying a machine learning model to the gameplay video or gameplay metadata to recognize the gameplay activity.

In some implementations, analyzing each game stream includes analyzing movements of players in each game stream.

In some implementations, the spectating preferences of the user include one or more types of gameplay activity.

In some implementations, each session is executed by a cloud gaming system.

In some implementations, a method is provided, performed by at least one server computer, for providing spectating of gameplay of a video game, comprising: receiving a plurality of game streams, each game stream being generated from an executing session of a video game; analyzing each game stream, to predict future gameplay activity in each game stream; obtaining spectating preferences of a user; determining a prioritization of the plurality of game streams based on the predicted future gameplay activity and the spectating preferences of the user; providing, over a network via a client device operated by the user, a recommendation of at least some of the game streams for spectating based on the determined prioritization; responsive to receiving, over the network from the client device, a selection of one of the recommended game streams, then providing, over the network to the client device, the selected game stream for spectating by the user.

In some implementations, each game stream includes gameplay video or gameplay metadata, generated from the executing session of the video game.

In some implementations, analyzing each game stream includes applying a machine learning model to the gameplay video or gameplay metadata to predict the future gameplay activity.

In some implementations, analyzing each game stream includes analyzing movements of players in each game stream.

In some implementations, the spectating preferences of the user include one or more types of gameplay activity.

In some implementations, each session is executed by a cloud gaming system.

In some implementations, providing the selected game stream enables spectating by the user to begin prior to the predicted future gameplay activity occurring.

In some implementations, a non-transitory computer readable medium is provided having program instructions embodied thereon that, when performed by at least one server computer, cause said at least one server computer to perform a method for providing spectating of gameplay of a video game, said method comprising: receiving a plurality of game streams, each game stream being generated from an executing session of a video game; analyzing each game stream, to recognize gameplay activity depicted in each game stream; obtaining spectating preferences of a user; determining a prioritization of the plurality of game streams based on the recognized gameplay activity and the spectating preferences of the user; providing, over a network via a client device operated by the user, a recommendation of at least some of the game streams for spectating based on the determined prioritization; responsive to receiving, over the network from the client device, a selection of one of the recommended game streams, then providing, over the network to the client device, the selected game stream for spectating by the user.

In some implementations, a method is provided, performed by at least one server computer, for enabling a spectator of a video game to provide assistance to a player, comprising: streaming, over a network to a spectator client device operated by a spectator, gameplay video generated from a session of a video game driven by interactive gameplay of a player via a player client device, the gameplay video being rendered by the spectator client device through a spectator interface for viewing by the spectator; during the streaming of the gameplay video, receiving a request from the player client device; responsive to the request from the player client device, surfacing a notification through the spectator interface, the notification indicating a request for assistance with the gameplay; receiving via the spectator interface, a response to the notification indicating acceptance of the request for assistance; responsive to receiving the response, initiating a private communication channel between the spectator client device and the player client device to enable communication between the spectator and the player.

In some implementations, the private communication channel is not accessible by other spectators of the gameplay video.

In some implementations, the private communication channel enables text, audio, or video communication between the spectator and the player.

In some implementations, the spectator interface is defined through a gaming platform, a website, or an app.

In some implementations, the method further includes: using a machine learning model to analyze the interactive gameplay to recognize a difficulty encountered by the player; responsive to the recognition of the difficulty encountered by the player, presenting through the player client device a prompt to request assistance from the spectator; wherein the request from the player client device is responsive to the presenting of the prompt to request assistance from the spectator.

In some implementations, using the machine learning model to analyze the interactive gameplay includes analyzing one or more of points scored or player progress.

In some implementations, a method is provided, performed by at least one server computer, for enabling a spectator of a video game to provide assistance to a player, comprising: streaming, over a network to a spectator client device operated by a spectator, gameplay video generated from a session of a video game driven by interactive gameplay of a player via a player client device, the gameplay video being rendered by the spectator client device through a spectator interface for viewing by the spectator; during the streaming of the gameplay video, receiving a request from the spectator client device; responsive to the request from the spectator client device, presenting through the player client device a notification indicating an offer of assistance with the gameplay; receiving from the player client device, a response to the notification indicating acceptance of the offer of assistance; responsive to receiving the response, initiating a private communication channel between the spectator client device and the player client device to enable communication between the spectator and the player.

In some implementations, the private communication channel is not accessible by other spectators of the gameplay video.

In some implementations, the private communication channel enables text, audio, or video communication between the spectator and the player.

In some implementations, the spectator interface is defined through a gaming platform, a website, or an app.

In some implementations, the method further includes: using a machine learning model to analyze the interactive gameplay to recognize a difficulty encountered by the player; responsive to the recognition of the difficulty encountered by the player, presenting through the spectator client device a prompt to offer assistance to the player; wherein the request from the spectator client device is responsive to the presenting of the prompt to offer assistance to the player.

In some implementations, using the machine learning model to analyze the interactive gameplay includes analyzing one or more of points scored or player progress.

In some implementations, a non-transitory computer readable medium having program instructions embodied thereon is provided, said program instructions being configured, when executed by at least one server computer, to cause said at least one server computer to perform a method for enabling a spectator of a video game to provide assistance to a player, said method comprising: streaming, over a network to a spectator client device operated by a spectator, gameplay video generated from a session of a video game driven by interactive gameplay of a player via a player client device, the gameplay video being rendered by the spectator client device through a spectator interface for viewing by the spectator; during the streaming of the gameplay video, receiving a request from the player client device; responsive to the request from the player client device, surfacing a notification through the spectator interface, the notification indicating a request for assistance with the gameplay; receiving via the spectator interface, a response to the notification indicating acceptance of the request for assistance; responsive to receiving the response, initiating a private communication channel between the spectator client device and the player client device to enable communication between the spectator and the player.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Implementations of the present disclosure provide systems and methods for providing personalized recommendations to spectators regarding which video game sessions to spectate. Specifically recommended game streams can be tailored based on user indicated preferences, as well as based on learning of the user's preferences over time through analyzing the user's spectating selections and related behavior. Furthermore, recommendations are provided in a time-sensitive manner based on predicted activity in the game sessions. That is, a given user is recommended to spectate specific game streams based on predictions performed on the game streams that indicate that interesting gaming activity is likely to occur soon. This provides the user with an improved spectating experience, so that they are likely to enjoy interesting gaming activity imminently in a chosen game stream.

Implementations of the present disclosure further provide a spectator helper mode, whereby a spectator is enabled to provide assistance to a player. This provides an additional level of engagement for spectators while aiding players in their gameplay.

Figure 1:
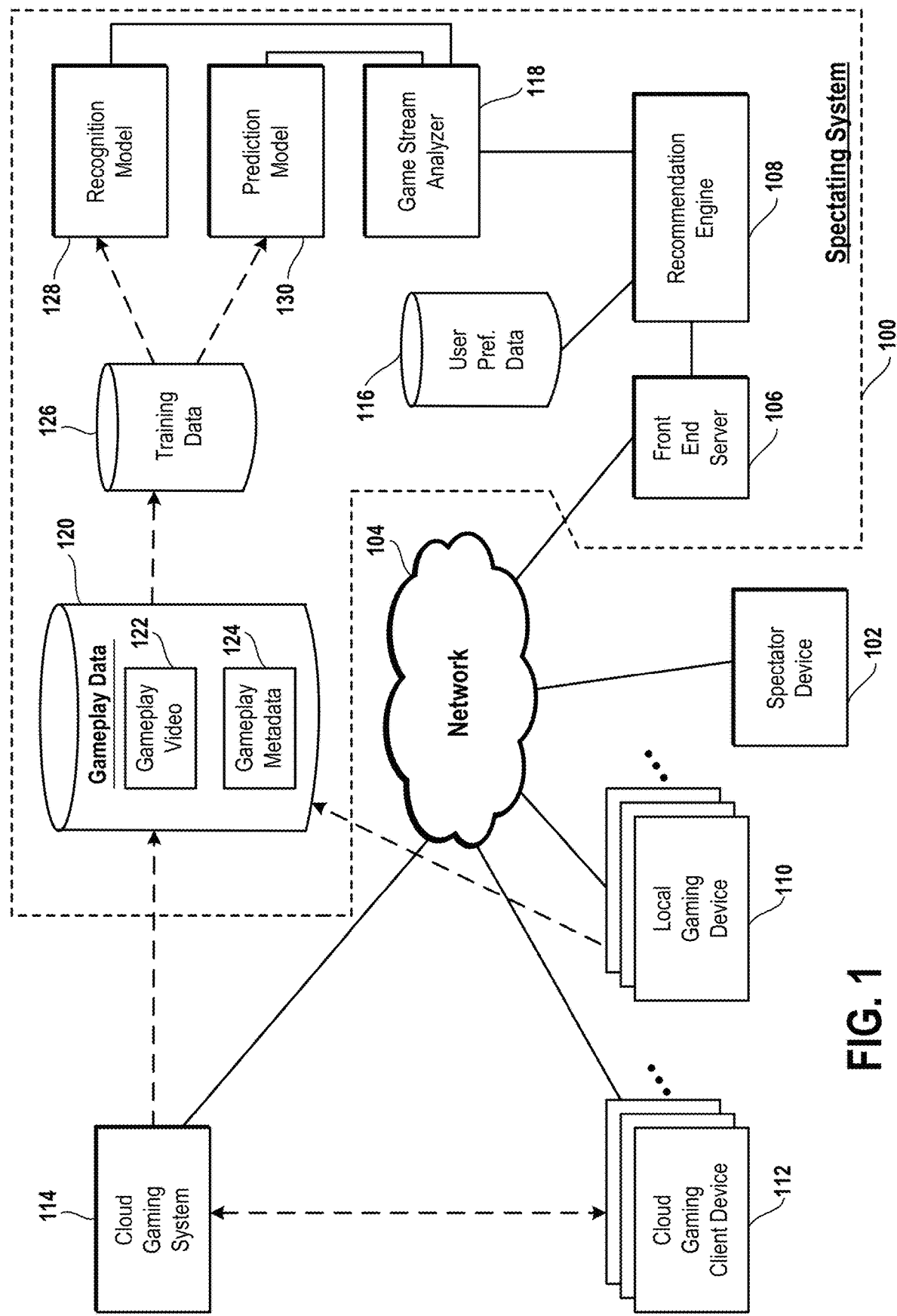
FIG. 1 conceptually illustrates a system for providing game stream recommendations to a spectator, in accordance with implementations of the disclosure.

FIG. 1 conceptually illustrates a system for providing game stream recommendations to a spectator, in accordance with implementations of the disclosure.

In the illustrated implementation, a spectator device 102 communicates over a network 104 (e.g. the Internet) with a spectating system 100. Broadly speaking, the spectator device 102 is operated by a spectator to receive recommendations from the spectating system 100 and receive specific game streams to spectate through the spectator device 102. By way of example without limitation, the spectator device 102 can be a computer, laptop, game console, tablet, cellular phone, or any other type of computing device capable of receiving and rendering to a display a view of a video game session for spectating purposes. In some implementations, the spectator device 102 includes a display, whereas in other implementations the spectator device 102 renders video/images to a separate display device.

In the illustrated implementation, the spectating system 100 includes a front-end server 106, which is at least one server that interfaces with the spectator device 102 to provide game stream recommendations as well as selected game streams for spectating through the spectator device 102. A recommendation engine 108 determines for a given spectator which specific game streams to recommend. As discussed in further detail below, this can be based on user preferences, which can be user-defined and/or inferred, as well as based on recognition and/or prediction of interesting activity that is about to occur.

In the illustrated implementation, game streams are generated from game sessions occurring in various ways. One example is through cloud gaming, in which cloud gaming client devices 112 stream gameplay from a cloud gaming system 114, with the cloud gaming system 114 performing the execution of the video game sessions, and serving gameplay video in real-time to the cloud gaming client devices 112. The cloud gaming client devices 112 receive input/commands from players and transmit these back up to the cloud gaming system 114 to be applied to the executing video game sessions. Another example of game instances that generate game streams is through locally executed game sessions on local gaming devices 110, such as computers, game consoles, etc. It will be appreciated that such game sessions can be single-player game sessions or multi-player game sessions.

The game streams generated from such game sessions are provided over the network 104 to the spectating system 100. One or more of the game streams can be served to the spectator device 102 by the spectating system 100, e.g. through the front end server 106 which can include or function as a streaming server in some implementations, to stream gameplay video to the spectator device 102. As noted, the spectating system 100 includes a recommendation engine 108 that recommends specific ones of the game streams for the spectator to view, and the spectator may choose one of the recommended game streams to spectate.

Broadly speaking, the game streams generated by the various game sessions include gameplay video, and may further include gameplay metadata that is generated from the execution of the game sessions. The gameplay metadata includes any type of data indicative of activity occurring in a given game session, such as game state data, locations/positions/orientations/movements of players in the game's virtual environment, player inventories, weapon firing events, weapon states (e.g. armed, loaded, drawn, etc.), attack events, virtual character/entity maneuvers, health/energy states, points, goals, scores, etc. In some implementations, these are stored by the spectating system 100 to a gameplay data storage 120, as gameplay video 132 and gameplay metadata 124 as shown in the illustrated implementation.

In some implementations, the spectating system 100 uses machine learning to recognize and/or predict activity in the game streams. Based on such recognized and/or predicted activity, recommendations to the spectator regarding which streams to spectate can be provided, and in some implementations, automatically selected on behalf of the spectator. With continued reference to FIG. 1, in some implementations, the gameplay data 120 is processed into training data 126. The training data 126 is then used to train one or more machine learning models, such as a recognition model 128 that is configured to recognize gaming activity occurring in a game stream, or prediction model 130 that is configured to predict future gaming activity in a game stream. It will be appreciated that such recognition or prediction can be based on application of the models to the gameplay video and/or the gameplay metadata from the game stream, which the models have been trained to analyze. Additionally, it will be appreciated that there are many different video games, and accordingly, there can be many recognition and prediction models in various implementations, which may be specific to individual video games or portions (e.g. level, scene, chapter, etc.) or modes thereof (e.g. single player campaign mode versus multiplayer mode). For ease of description, single recognition and prediction models are referenced in the present disclosure, but it will be appreciated that many such models can be provided as needed to accommodate the full scope of various video games whose game streams are made available for spectating.

The game stream analyzer 118 applies the trained machine learning models (such as recognition or prediction models 128 and 130) to live or pre-recorded game streams in order to identify current activity occurring in the game streams or predict future activity that is likely to occur in the game streams. The current activity and/or predicted future activity is then utilized by the recommendation engine 108 to determine recommended game streams for the spectator. For example, the recommendation engine 108 may sort the game streams based on various criteria or characteristics of their identified current activity and/or predicted future activity, such as the type of the activity, the amount/level/quantity of the activity, the duration of the activity, audience reactions to the activity (e.g. comments, spectator audio/video, etc.), number of participants in the activity, characteristics of participants in the activity (e.g. skill/achievement/experience levels of participants, geo-location of participants, language of participants, etc.), the game stage/level/scene of the activity, etc.

In some implementations, weighted scores for such criteria or characteristics are determined and combined or summed to determine overall scores for the various game streams, which are used to rank the available game streams for recommendation to the spectator. In some implementations, the ranking is further affected by preferences or characteristics of the spectator which are stored as user preference data 116 in the illustrated implementation. For example, in some implementations, the preferences of the spectator affect the weights which are applied in the weighted scoring described above. In other implementations, the characteristics/preferences of the spectator can be used to filter/sort the ranked results of the scoring process. It will be appreciated that some preferences may affect the weighting whereas some preferences may be used for filtering or sorting.

The spectator preferences can be inferred in some implementations, and/or explicitly determined in some implementations. For example, spectator preferences can be inferred based on user demographic data or other existing user data, such as age, geo-location, gender, game titles owned/played, experience level, game spectating history, gameplay history, etc. Spectator preferences can be explicitly determined by soliciting input from the spectator indicating their preferences, such as by surveying the spectator regarding which games they like to spectate, or which genres/types of games (e.g. action, sports, first-person shooter, racing, real-time strategy, melee, co-op, etc.), which types of activity they like to spectate (e.g. fighting, scoring, boss battles, close-range fighting, airstrikes, detecting new terrain or new area not previously used in the game before, new weapon type, new hardware available to be found, etc.). It will be appreciated that there can be more general and more specific categories enabling the user to indicate to their chosen level of specificity the kinds of games or gaming activity that they are interested in spectating. For example, a user may indicate that they are interested in spectating soccer games, and more specifically goals, penalty kicks and corner kicks, by way of example without limitation.

Furthermore, in some implementations, a user may indicate specific players that they are interested in spectating. In some implementations, a user may indicate the types of players that they are interested in spectating (e.g. players of a certain experience/skill level in a game, players with a given number of followers, players of a certain character type, players from a certain country or region, etc.).

It will be appreciated that the presently described models are used to scan the game streams and are configured to identify/predict gameplay activity including such characteristics as have been described. And based on this information, the recommendation engine 108 provides suggestions regarding which game streams to spectate. Additionally, the user's selections of game streams for spectating can further be used as feedback for the system. That is, the user's preferences can be learned/inferred by the system over time from the user's choices in selecting which game streams to spectate, as well as other related data indicative of the user's spectating preferences, such as searches performed by the user for content to spectate, the length of time the user spends spectating various chosen game streams, interactions or reactions by the user when spectating (e.g. comments, microphone audio of the user's reactions while spectating), shares by the user of a spectated game stream or related content such as a screenshot or video clip (e.g. sharing via social media, a spectating/gaming platform, or other communications platforms), etc. The user's preferences can also be inferred, at least in part, from other known data about the user, such as which games they play or have in their library, or other user demographic data.

While in some implementations, the system presents spectating options to the user, in other implementations, the system can be configured to automatically select a game stream for the user to spectate. That is, the system can automatically and directly bring the user to a system-selected game stream that is selected based on factors such as those described above relating to the user's preferences (explicitly defined and/or inferred).

Figure 2:
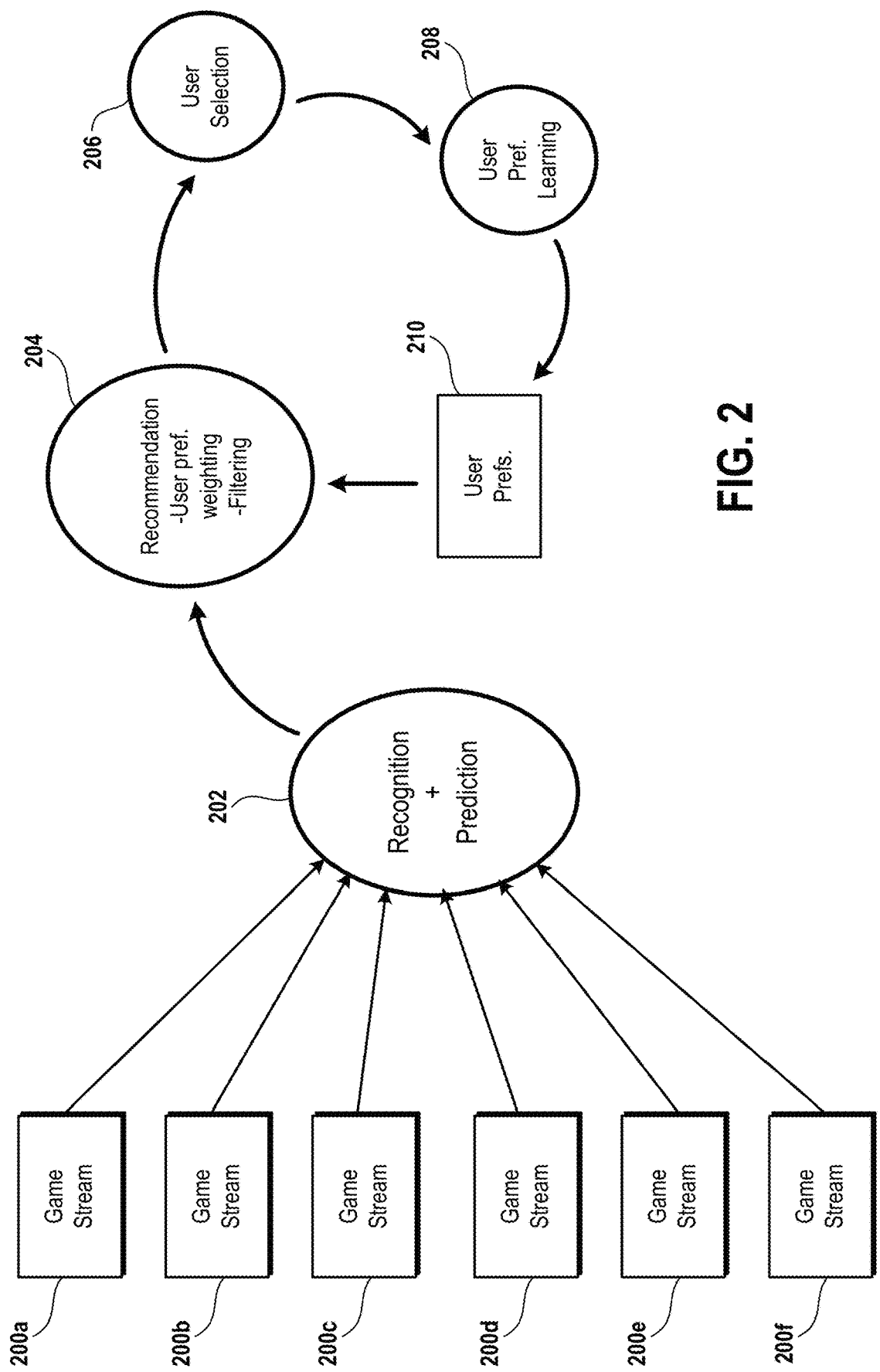
FIG. 2 conceptually illustrates a process for recommending game streams to a user to spectate, in accordance with implementations of the disclosure.

FIG. 2 conceptually illustrates a process for recommending game streams to a user to spectate, in accordance with implementations of the disclosure.

In the illustrated implementation, a plurality of gamestreams 200*a-f*, etc. are conceptually shown. At method of operation 202, recognition and/or prediction processes are applied to the game streams 200, Such as through the application of machine learning models as described. The recognition/prediction processes are respectively configured to identify activity occurring in the game streams and predict future activity that is expected to occur in the game streams based on current conditions. At method operation 204, the identified/predicted activity is utilized to recommend certain ones of the game streams to the user to spectate. In some implementations, user preferences 210 are applied in order to determine which gamestreams to recommend based on their characteristics and their current or predicted activity. For example, in some implementations, the game streams are filtered according to user preferences So as to identify those gamestreams possessing characteristics or activity that the user prefers. In some implementations, weights are assigned to various factors according to the user preferences and these are applied to the characteristics and identified/predicted activity of the game streams for purposes of scoring the game streams to enable ranking to determine which game streams to recommend to the user.

At method operation 206, the user selection of a given game stream from among the recommended game streams is received, and accordingly the chosen game stream is served to the user for the user to spectate. At method operation 208, the user selection is utilized as feedback for further inferring and refining the system's understanding of the user's preferences. Thus, the system can continually learn and improve its understanding of the user's preferences 210, based on the user's selections of recommended game streams, and further based on user interactions with the selected game streams.

Figure 3:
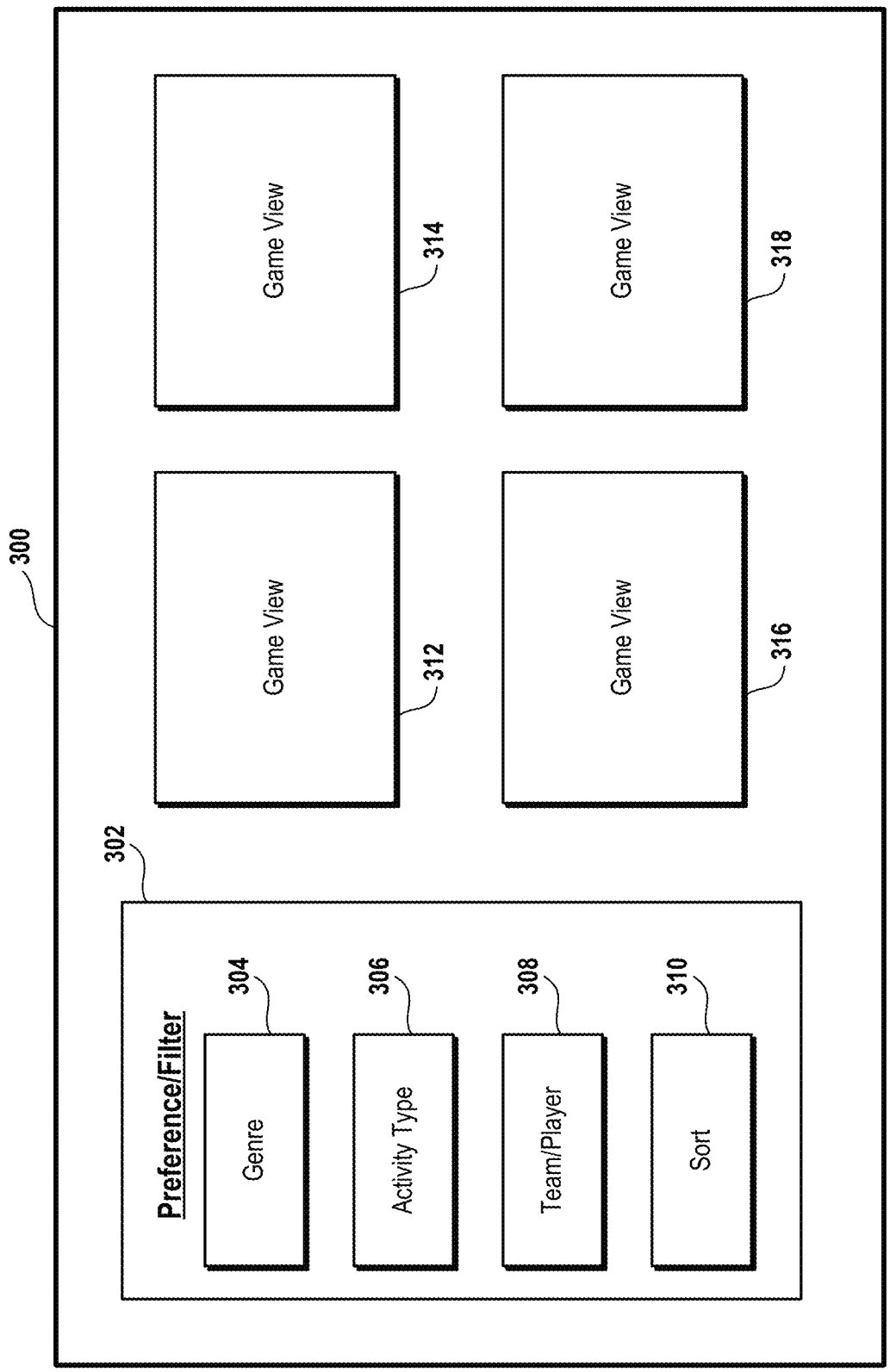
FIG. 3 conceptually illustrates an interface for spectating game streams, in accordance with implementations of the disclosure.

FIG. 3 conceptually illustrates an interface for spectating game streams, in accordance with implementations of the disclosure.

In the illustrated implementation, an interface 300 is shown, which can be provided through the spectator device 102, e.g. via a gaming platform or application such as a web browser (e.g. accessing a website/webpage), app, etc. Within the interface 300, a user preference interface 302 is provided through which the user can define their preferences for content to spectate. In the illustrated implementation, the user preference interface 302 includes various button selectors which can be selected to access menus enabling user definition of preferences for spectating.

For example, a game selector 304 is configured to enable the user to identify individual games or types of games that they would prefer to spectate. An activity type selector 306 is configured to enable the user to identify types of activity that the user would like to spectate. A team/player selector 308 is configured to enable the user to indicate specific players or teams that they would like to spectate. A sort selector 310 is configured to enable the user to specify ways in which they would like spectating recommendations to be prioritized or sorted, such as specifying prioritizations of any of the other preferences defined by the user, or sorting based on criteria such as popularity of game stream (e.g. number of users spectating), age of game session, skill level of players involved, number of players playing, distance of game session host from the user, etc.

Though in the illustrated implementation, the user preference interface 302 is in the form of button selectors accessing menus of options, in other implementations, the user preference interface 302 can take other forms to enable the user to input their preferences. In some implementations, the user preference interface 302 is in the form of a series of questions that are presented to the user, and by answering the series of questions, the user defines their preferences to the system. By way of example without limitation, such questions can be configured to inquire about any of the aforementioned categories of preferences, such as game titles, game types, types of activity, etc. In some implementations, the questions presented to the user include options for the user to select as answers, and/or fields for the user to input answers. In some implementations, the user can rank their responses to a given question (e.g. ranking preferred game titles in order from most to least preferred).

In some implementations, the user preference interface 302 is instantiated as a set-up operation, which can be automatically presented to a new user of the system when they set up their account or otherwise initially access the spectating system or seek to spectate game streams.

With continued reference to the implementation of FIG. 3, several game views 312, 314, 316, and 318 are included in the interface 300. The game views are configured to present views of recommended game streams, which can be recommended to the user based on their preferences and recognized/predicted activity in the game streams themselves as described in the present disclosure. In some implementations, a game view takes the form of a recent image or representative image of a game stream. Whereas in some implementations, the game view provides a live view of the game stream, thereby providing an actual spectator view, but in miniaturized form so as to accommodate multiple game views in the interface 300. In some implementations, the game view provides a cropped view from the game stream, which can be configured to focus upon a certain aspect of the game stream, such as a character or other entity that is being rendered in the game stream. In some implementations, the game views are presented through the user interface as an array of tiles, enabling simultaneous viewing and browsing of several game views at once by the user.

In some implementations, the user preference interface 302 is configured to act as a filter for the game views, filtering the various recommended game streams based on criteria defined by the user so as to provide views of game streams that meet the selected filtering criteria. Such filtering criteria can include any of the described categories of spectating preferences, as well as other filtering parameters.

In some implementations, selection of one of the game views triggers maximizing of the view of the game stream and provides live spectating of the game stream video.

Figure 4A:
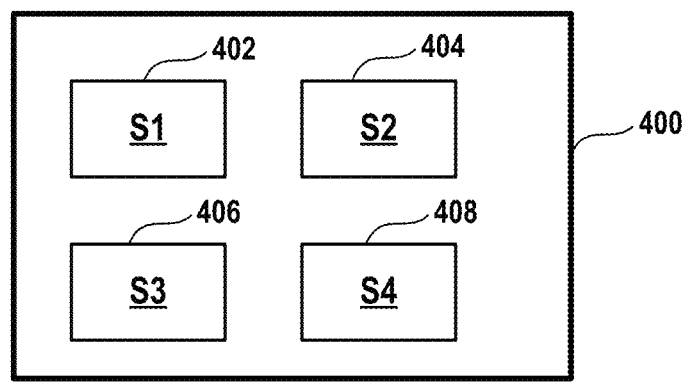
FIGS. 4A, 4B, and 4C illustrate views of a spectating interface over time, in accordance with implementations of the disclosure.
Figure 4B:
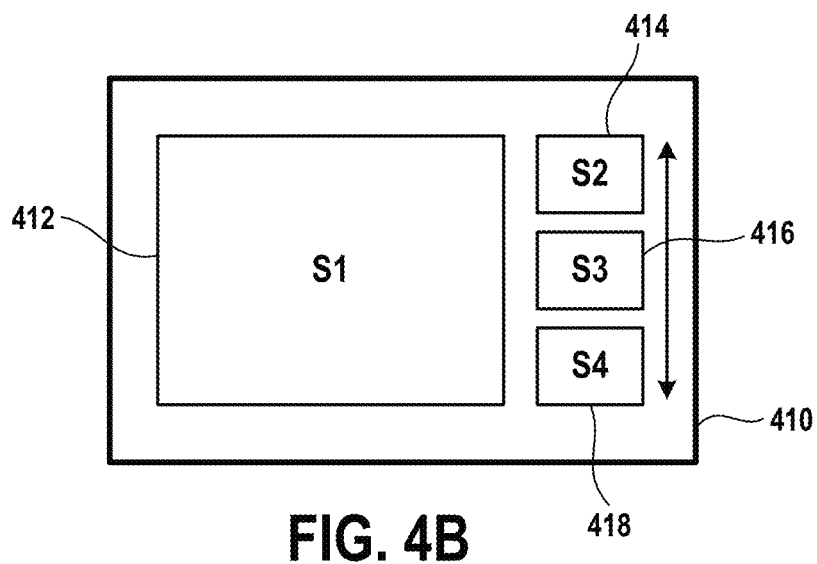
Figure 4C:
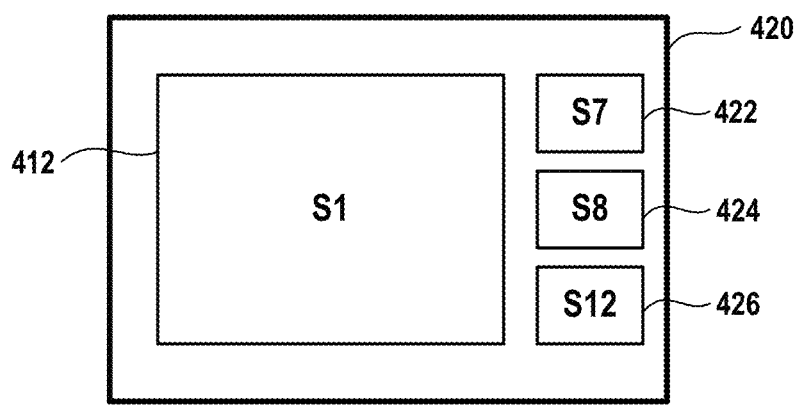

FIGS. 4A, 4B, and 4C illustrate views of a spectating interface over time, in accordance with implementations of the disclosure.

At an initial time the spectating interface is shown at FIG. 4A having a state 400, which includes several recommended game views 402, 404, 406, 408 of various recommended game streams. As noted above, such game views can include images or live video from the game streams, which can be recommended based on user preferences and recognized/predicted activity as described in the present disclosure. By way of example without limitation, in the illustrated implementation, the game view 402 is of a game stream S1; the game view 404 is of a game stream S2; the game view 406 is of a game stream S3; the game view 408 is of a game stream S4.

In the illustrated implementation, the user may select the game view 402, such as by clicking on the game view 402 or pressing a predefined button or otherwise selecting the game view 402 to indicate their desire to spectate the game stream S1. In response, the view of the spectating interface changes to the state 410 as shown at FIG. 4B, whereby the game steam S1 is shown in an expanded game view 412, that presents the live view of the game stream S1 for spectating by the user. Additionally, the other non-selected but recommended game streams S2, S3, and S4, are now viewable along a side of the interface as thumbnail/miniature views 414, 416, and 418, respectively. It will be appreciated that the thumbnail views 414, 416, and 418 provide views of game streams that are recommended to the user by the system. Accordingly, as the specifically recommended game streams change over time, so does the listing of thumbnail views.

For example, at a subsequent time the spectating interface has state 420 as shown at FIG. 4C. In the illustrated implementation, the user continues to view the game stream S1 via the game view 412, but along the sidebar portion the additionally recommended game streams have changed, now being game views 422, 424, and 426 of game streams S7, S8, and S12. It will be appreciated that the game streams being recommended are determined based on recognized/predicted activity in the game streams, and as such activity is changing over time, so the recommendations of which game streams to spectate are time sensitive. That is, different game streams will be recommended to the user at different times based on the activity occurring in the game streams at those times (and resulting predicted activity), and thus the recommendations are not static but are dynamically changing over time. It will be appreciated that the user can select from these recommended game streams and thereby switch to watching a different game stream than the current one that they are spectating.

Figure 5:
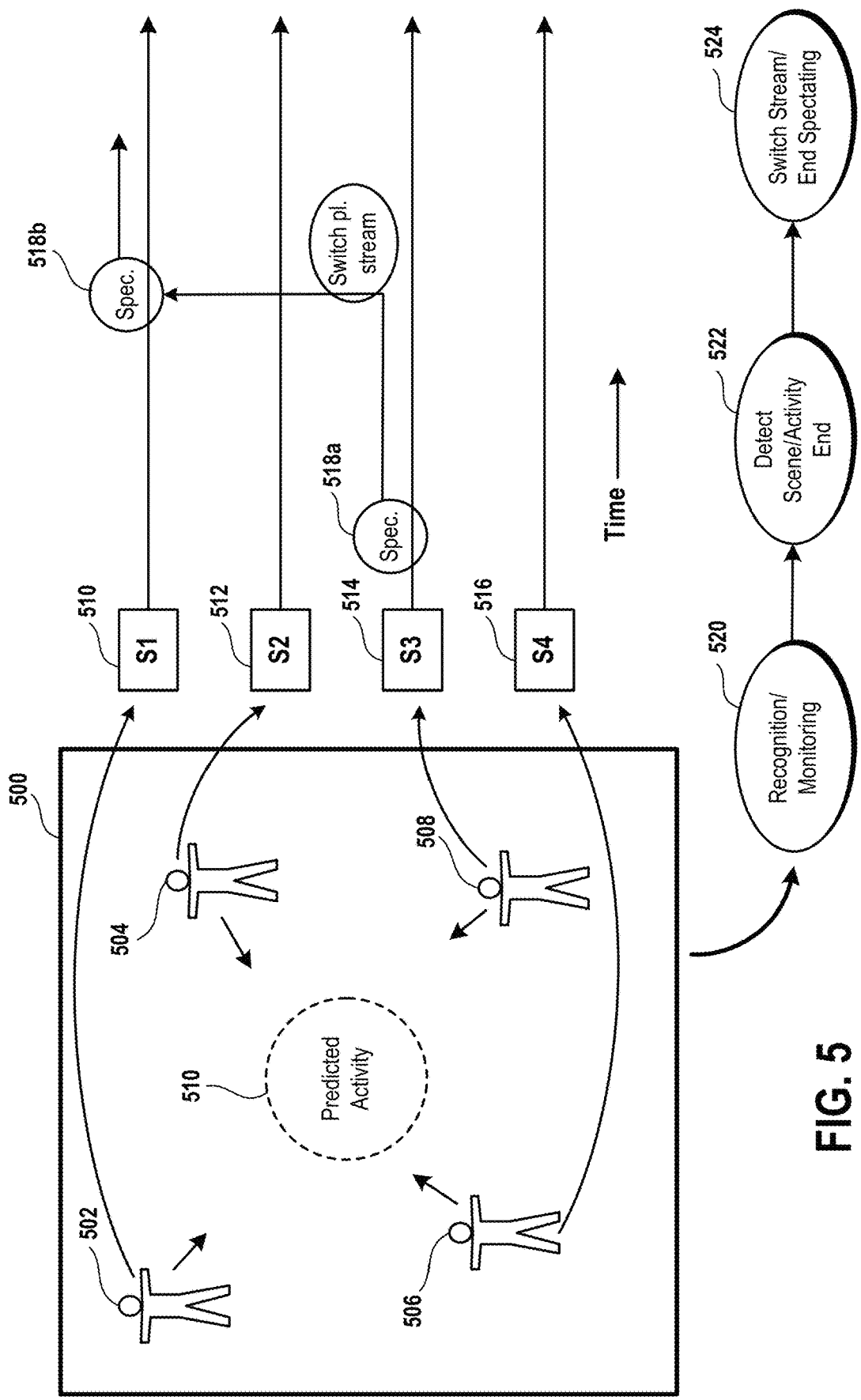
FIG. 5 conceptually illustrates automatic selection of player game streams for spectating, in accordance with implementations of the disclosure.

FIG. 5 conceptually illustrates automatic selection of player game streams for spectating, in accordance with implementations of the disclosure.

In some implementations, the system can be configured to automatically select game streams for the user to spectate, which can be based on the user's preferences and current recognized/predicted activity occurring in the game streams. In the illustrated implementation, gameplay activity is occurring in a virtual environment 500 involving players 502, 504, 506, and 508. It will be appreciated that any of the players 502, 504, 506, and 508 can have game streams associated therewith, which can enable spectating from their respective points of view. In some implementations, the system analyzes the game session activity, such as the positions/movements or other activity of the players, and/or analyzes the game streams of the players, to identify and/or predict gameplay activity that may be of interest to the spectator. For example, in the illustrated implementation, a predicted activity 510 is predicted to occur in the virtual environment 500.

Accordingly, the system may automatically direct the spectator to spectate the game session, and more specifically, spectate a player that is predicted to be involved in the predicted activity 510. It will be appreciated that at some point, the gameplay activity may cease to be interesting to the spectator, and the spectator may wish to spectate something else. Accordingly, in some implementations, the system continues to perform recognition/monitoring (ref. 520) of the game session/streams that the spectator is spectating. Upon detecting that the scene or gameplay activity has ended (ref. 522) or is otherwise determined to no longer be interesting to the spectator, then the system may automatically switch the spectator to another game stream or otherwise end the spectating of the current game stream (ref. 524). In some implementations, detecting the end of a scene or activity can be determined by the system based on various factors, such as detecting reductions in levels of activity occurring in the current game stream (e.g. amounts of weapons firing, amounts of movement, numbers of participating players in the scene, etc.), detecting a reduction in the number of spectators indicating that spectators are leaving the game stream, detecting movement of a player to a new region of the virtual environment, etc. By detecting when a given spectated scene or particular game activity has ended, or ceases to be interesting, then the system can automatically shift the spectator to another stream that is likely to be more interesting (as determined from applied recognition/prediction), and therefore prevent the spectator from becoming disinterested.

In some implementations, rather than automatically change or end the spectator's viewing of the game stream, the system prompts the spectator when it is detected that the scene of interest has ended or activity ceases to be interesting, such as by asking the spectator if they would like to view a different game stream or stop viewing of the current game stream.

In some implementations, the system is configured to automatically select from among different players that are involved in gameplay of the same multiplayer session. For example, in the illustrated implementation, the players 502, 504, 506, and 508 are all engaged in multiplayer gameplay of the same game session, in the virtual environment 500 as shown. Each of the players 502, 504, 506, and 508 has a corresponding game stream 510, 512, 514, and 516, respectively. In some implementations, the system is configured to evaluate which of the player game streams is currently optimal for the spectator, and automatically switch between different player game streams depending upon which game stream is currently determined to be most interesting for the spectator (e.g. based on recognized/predicted gameplay activity in the game streams and the user's preferences). Hence, the system monitors different players in the multi-player session and selects the player whose game stream is determined to be optimal for the spectator, thereby providing different views that can provide variety to the spectator's viewing experience even within a single multi-player session. It will be appreciated that such views are automatically provided at times when the system determines that a given player's game stream is exhibiting or predicted to exhibit interesting activity to spectate. To prevent too much switching from one player to another player, in some implementations, spectating of a given player is provided for a predefined minimum amount of time before switching to another player's game stream. Further, in some implementations, spectating of a given player may be configured to persist until it is determined that a given scene or activity has ended, similar to that described above.

Also, in some implementations, a customizable value is introduced to determine whether a stream switch occurs. For example, a stream interest value can be determined for each of the game streams, the stream interest value being indicative of the expected interest in a given stream by the spectator (for example, based on game activity and user preferences). And a switch would occur if the stream interest value of the new stream exceeds that of the current stream by a certain threshold.

By way of example without limitation, in the illustrated implementation, at an initial timepoint the spectator (ref. 518a) spectates game stream 514 which is the game stream of player 508. Later it is determined that the game stream 510 is more interesting for the spectator, and accordingly, the system switches the spectator from spectating game stream 514 to spectating game stream 510 (shown at ref. 518b), which is the game stream of player 502. In this manner, the spectator is provided optimal views of the multi-player game session, from the vantage point of different players engaged in the same multi-player game session and in a timely manner that automatically switches the user to spectate interesting gameplay activity amongst the different players game streams.

Figure 6:
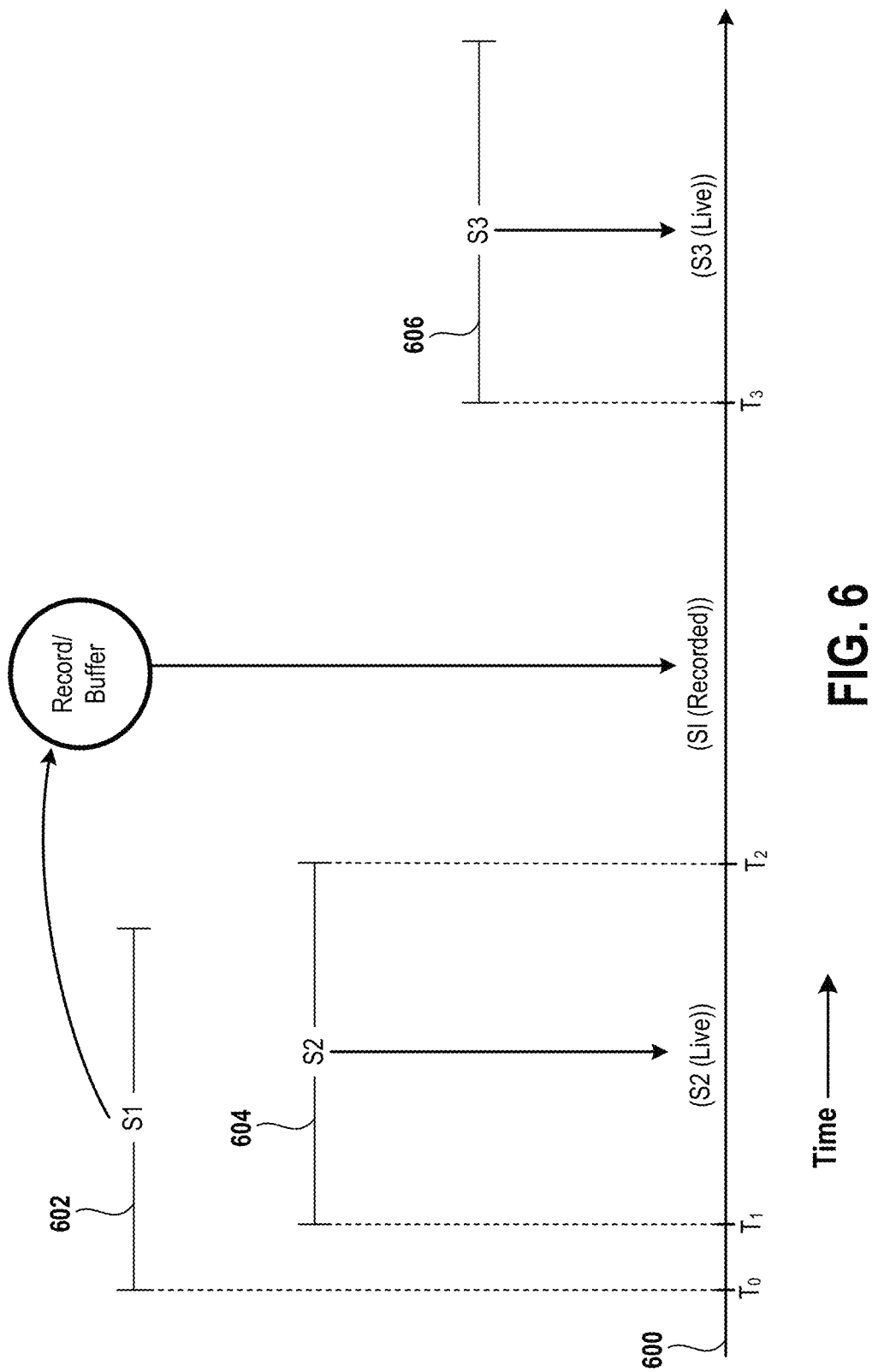
FIG. 6 conceptually illustrates insertion of pre-recorded gameplay between segments of live spectating, in accordance with implementations of the disclosure.

FIG. 6 conceptually illustrates insertion of pre-recorded gameplay between segments of live spectating, in accordance with implementations of the disclosure.

It will be appreciated that at times there may not be interesting gameplay that the player wishes to spectate that is occurring currently (live). Therefore, in some implementations, the system can automatically provide pre-recorded content during times when there is no other interesting live content to spectate.

For example, in the illustrated implementation of FIG. 6, a user's spectating timeline is conceptually illustrated at ref. 600. There are various scenes of gameplay that are conceptually illustrated as horizontal bars spanning the time at which they occur. Scene S1 (ref. 602) initiates prior to the user activating the system to spectate content at time T0, and as such, the scene S1 is already in progress when the spectator initiates spectating. However, the scene S1 has been identified by the system as gameplay that matches the user's preferences for spectating content, and accordingly, the system automatically records the scene S1.

Being that the scene S1 is already in progress when the user seeks to initiate spectating, then the system does not direct the user to spectate scene S1, but rather directs the user to spectate a scene S2 (ref. 604), which initiates at a time T1 proximate to the time at which the user initiates spectating and is also a scene that the system has determined to be likely of interest to the user. Accordingly, the system directs the user to spectate scene S2, while scene S1 is also occurring simultaneously but is being automatically recorded/buffered.

At the conclusion of scene S2 at time T2, there may be no current gameplay that the system would determine to be likely of interest to the user. During this time, then in some implementations, the system may insert the prerecorded scene S1 for the user to spectate. That is, the system may automatically switch the user from spectating the live scene S2 to spectating the recording of scene S1. In this manner, the system is able to continue serving content to the user which the user is likely to find interesting, and the user is further able to spectate activity that they might otherwise have missed as it (or at least some of the activity of scene S1) was occurring concurrently while the user was spectating scene S2.

At a later time T3, the user is switched to spectate a scene S3 which occurs live. Thus, in the illustrated implementation, the pre-recorded scene is inserted between live spectating segments, enabling the user to enjoy interesting content even when such content is not actively occurring in a live sense, with the system automatically switching between live and pre-recorded content as needed. It will be appreciated that for a pre-recorded scene, the scene itself need not be complete at the time it is provided to the user to spectate from the beginning of the scene. In such instances, the user begins spectating from the start of the scene, even as the scene is continuing with gameplay in progress, and the user therefore is viewing the scene in a time-delayed manner which can be provided from a buffer.

Extending the concept, in some implementations, gameplay is buffered to a certain extent and this expands the scope of possible scenes that the system may consider to automatically select for spectating at a given time. That is, the user may be directed to spectate a live or buffered scene depending upon which is determined to be suitable for the user according to the user's preferences as previously described. For example, the user may be directed to spectate any scene initiating within the past N number of seconds/minutes that is determined to sufficiently or most closely match the user's spectating preferences.

Further extending the concept, in some implementations, recording can be triggered by the spectator. For example, with continued reference to FIGS. 4A, 4B, and 4C described above, as the user receives suggestions of game streams to spectate from the system in the form of thumbnail/tile views (e.g. game views 414, 416, 418, etc.), in some implementations the user can mark or select a given game stream to be recorded, e.g. via a selectable option or predefined button, etc. In some implementations, the game view of the selected game stream is not replaced by any new suggestion, but rather remains as a pinned tile until, at a certain later point in time the user chooses to activate this tile for playback.

Figure 7:
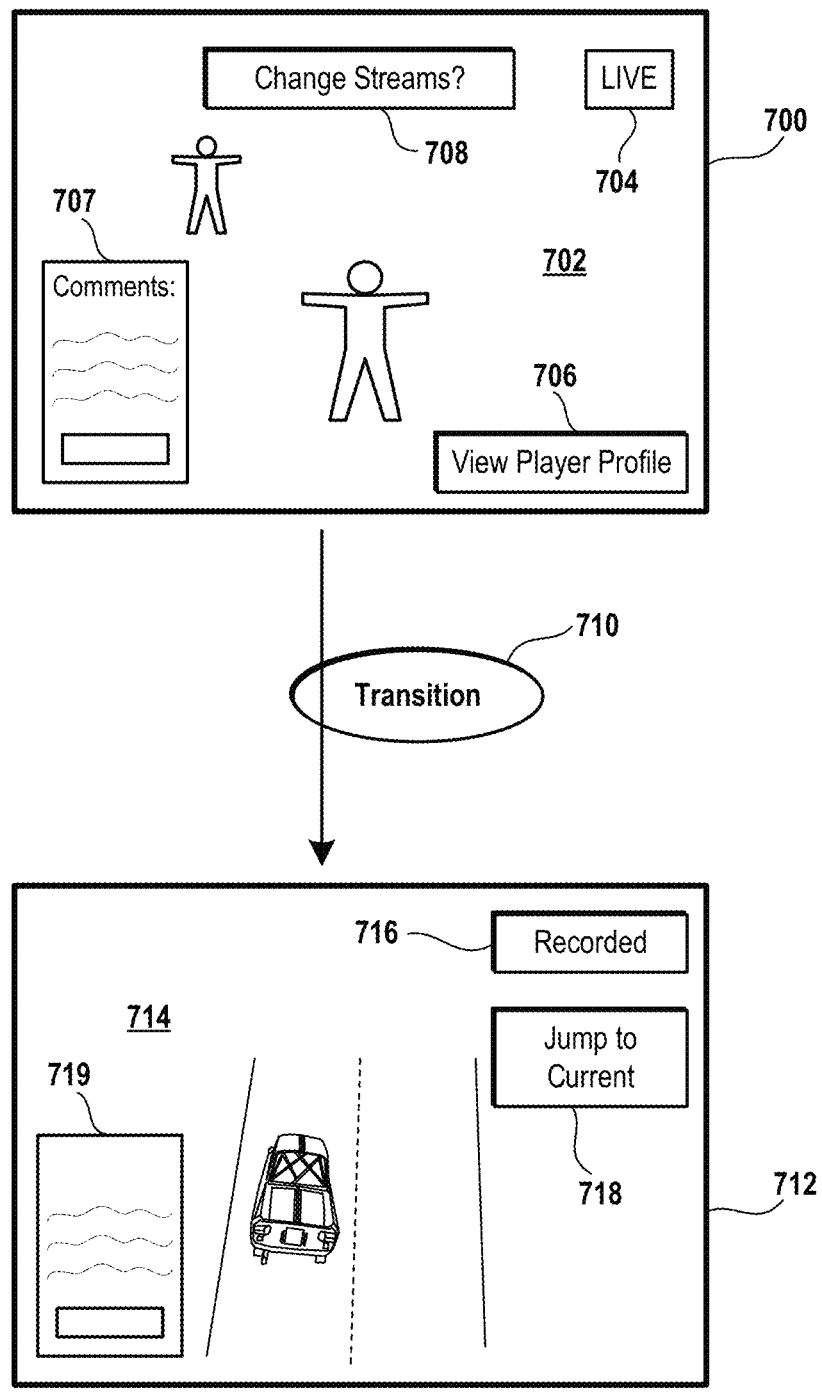
FIG. 7 conceptually illustrates transitioning between spectating different game streams, in accordance with implementations of the disclosure.

FIG. 7 conceptually illustrates transitioning between spectating different game streams, in accordance with implementations of the disclosure.

In the illustrated implementation, a user initially spectates a first game stream, and is provided a view 700 of a scene 702 of gameplay from the first game stream. The gameplay being spectated is occurring live, and the user is spectating the game in substantial real-time. Accordingly, an indicator 704 informs the user that the scene 702 being spectated is occurring live.

In some implementations, an option 706 to view a player profile of the player being spectated is provided, selection of which enables the user to access information about the player whose game stream is currently being spectated, such as player statistics, personal/demographic information, biographical information, as well as access to other recorded game streams of the player. In some implementations, a profile page of the player is provided that includes such information, which can be listed on a gaming platform, social network, or other site.

In the illustrated implementation, a comments stream 707 lists comments from spectators as the gameplay occurs, and the user is able to enter text comments that will appear in the comments stream 707, such as via a text input box, voice-to-text translation, etc.

As noted above, in some implementations, the system detects when activity in the currently spectated game stream is diminished or a current scene of gameplay has ended, and may automatically switch to a different game stream, or may prompt the user to change game streams. For example, in the illustrated implementation, a message 708 is displayed asking the user if they would like to change to another game stream. The user may respond yes/no via a predefined input response, such as pressing an assigned button on an input device, verbally saying yes or no, etc.

In the illustrated implementation, the user switches from spectating a first game stream to spectating a second game stream. When spectating the second game stream, the user is provided a view 712 of a gameplay scene 714. However, changing from spectating one game stream to another can be abrupt for the user. Therefore, in some implementations, a transition effect 710 is performed when switching between spectating different game streams. For example, in some implementations, a notification is provided to the user that the spectated game stream is about to change to a new stream. In some implementations, a countdown timer is rendered in the user's view indicating how much time is left before spectating of the current stream ends, and the change to the next game stream will begin.

In some implementations, when transitioning between spectating game streams, the former game stream is faded out, and/or the new game stream is faded in. In some implementations, when transitioning between game streams, information about the new game stream is provided to the user, such as the title of the game being played, the level/stage/scene of the game title, information about the player whose game stream is being spectated, information about a game objective that is sought to be achieved, recent history of activity that has occurred in the gameplay, etc.

As noted, in the illustrated implementation, the user transitions to spectating a view 712 of a gameplay scene 714. In the illustrated implementation, the scene being spectated has been previously recorded, and accordingly, an indicator 716 indicates that the currently spectated scene was recorded and is not live. In some implementations, an option 718 is provided for the user to jump to the current gameplay if it is still in progress. In some implementations, the user can fast-forward through the gameplay to reach the current gameplay that is happening live.

It will be appreciated that while spectating recorded gameplay, comments from other spectators that have been logged during spectating of the same gameplay (whether live or recorded) are displayed in a comments stream 719. Furthermore, the user may enter a comment while spectating, and such a comment will be associated to the time code of the recorded game stream at the moment the comment was entered. The user's comment will thus appear in the comments stream 719 during subsequent spectating replays of the recorded gameplay.

Implementations of the present disclosure have been described with reference to a user acting as a spectator that views another person's gameplay. In some implementations, a related helper mode is provided, whereby a spectator user can act as a helper to the player that they are spectating, and is provided with tools that enable the user to provide help through communication, alternative viewing, etc. Broadly speaking, for purposes of the present disclosure, a helper will be understood to be a person that is a non-participant in the game, but who is able to provide assistance to a player of the game. That is, the helper cannot perform actions that directly affect the game state of the executing session of the video game, such as providing inputs to the video game. But the helper is able to assist players that are participating in the gameplay, by providing coaching, guidance, assistance, etc. It will be appreciated that in various implementations of the present disclosure, unless otherwise incompatible, any descriptions of subject matter pertaining to users as spectators can also apply to users acting as helpers, for example, either directly or in combination.

Figure 8:
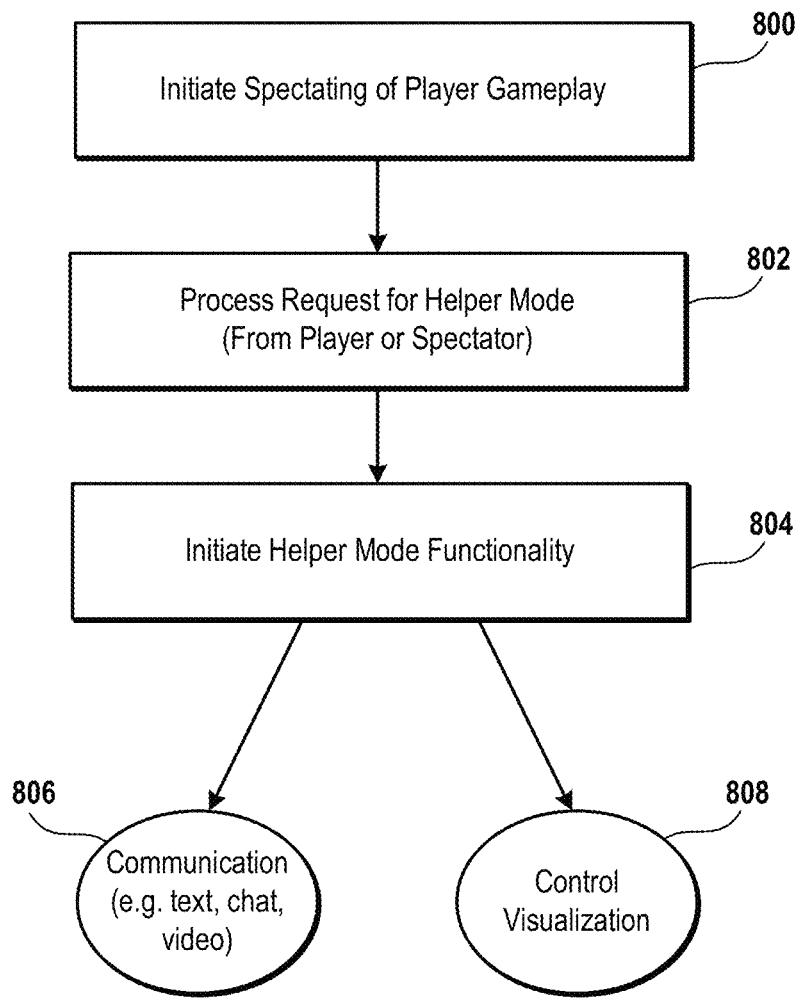
FIG. 8 conceptually illustrates a method for providing a helper mode of functionality, in accordance with implementations of the disclosure.

FIG. 8 conceptually illustrates a method for providing a helper mode of functionality, in accordance with implementations of the disclosure.

At method operation 800, a user initiates spectating of a player's gameplay in their game stream. By way of example without limitation, such spectating can be initiated as a result of system recommendation or auto-selection of game streams as described above in accordance with implementations of the disclosure.

At method operation 802, the system processes a request to initiate a helper mode, which can originate from the player or the spectating user in various implementations. In some implementations, the player can request help from one or more spectators that are currently viewing their gameplay, such as by selecting a menu option or activating an assigned input device. Such a request can be optionally targeted to specific ones of the spectators so as to improve the likelihood of receiving appropriate help, such as filtering the request to spectators having at least a predefined achievement level in the game (e.g. a skill/status level, a score, a high score, a number of points, a number of kills, an achievement level indicating completion of an objective/level/stage that the player is attempting to complete, etc.), a minimum amount of gameplay experience in the game (e.g. amount of time played, number of sessions played, etc.), or other metric or qualification defining suitability of a spectator to act as a helper for the player. In some implementations, the filtering of the request to the specific spectators is performed in response to such specification by the player (e.g. through an interface/menu providing filtering options), or automatically by the system.

The spectator that receives the request while spectating the gameplay may have a notification surfaced to them, such as a message rendered in their display indicating that the player is requesting their help for the gameplay, to which the spectator may respond by accepting or rejecting the request (e.g. via assigned buttons of an input device to indicate yes or no, etc.). In some implementations, the request is sent initially to a certain subset of the spectators for a predefined amount of time, and if no spectator responds in the affirmative within the predefined amount of time, then the request is sent to a next subset of the spectators, and so forth until a spectator responds in the affirmative. In some implementations, the spectators are prioritized for purposes of sending requests for help, such as based on the aforementioned achievement level or gameplay experience.

In some implementations, the system automatically detects when the player is struggling in the gameplay, and suggests to the player if they would like to request help from the spectator. In some implementations, the aforementioned recognition model can be trained to recognize situations in which the player is struggling or having difficulty, and accordingly such recognition can trigger suggestions to the player to request help from spectators. For example, recognition of a player struggling or encountering difficulty could be determined based on factors such progress of the player, points scored, advancement from scene to scene, player movements, enemy kills, player deaths, player health/energy depletion, or other factors indicative of difficulty faced by the player. In some implementations, such recognition is determined, at least in part, based on comparison to an expected rate of progress as determined from factors such as those above. In some implementations, the system is configured to predict when a player is likely to encounter difficulty, for example, based on the factors above, or based on predicted gameplay situations and information about the player's skill level or other indicators of the player's ability or predicted efficiency in handling the predicted gameplay situations.

In some implementations, the system processes a request originating from the spectator to offer help to the player. That is, the spectator is provided with an interface while spectating the player, that enables the spectator to offer to help the player during gameplay. It will be appreciated that responsive to such a request by the spectator, a notification can be surfaced in-game to the player, indicating that the given spectator is offering to help. The player can accordingly respond to the request by accepting or rejecting the offer of help (e.g. by pressing a button on an input device to indicate acceptance/rejection). As noted above, in some implementations, the system can recognize or predict when a player is having difficulty or struggling in the gameplay, and hence in some implementations, the system may prompt a spectator to offer help to the player in response to such recognition or prediction. In some implementations, spectator recommendations as previously described can be prioritized, at least in part, based on recognition or prediction of player difficulty and such players thereby being candidates for help by the spectator. In some implementations, the system enables the spectator to specify that they wish to engage in spectating players that are likely to request or accept spectator assistance.

In response to either the spectator accepting the player's request for help, or the player accepting the spectator's offer to help, then at method operation 804, a helper mode is initiated whereby the spectator is enabled to provide assistance to the player. In some implementations, this can entail initiating a communication channel 806 between the player and the spectator helper. In some implementations, the communication channel can enable text communication, voice communication, or video communication between the player and spectator helper. In some implementations, such video communication can include not only camera views of the player and spectator being exchanged, but can further enable the spectator to stream other forms of video to the player, such as recorded gameplay of another game stream. In some implementations, the video communication can include an alternate game view of the spectator that is different from that of the player (e.g. from a different location/perspective in a virtual environment, as described in further detail below). That is, the spectator's view is streamed to the player, thereby enabling the player to view, for example, other players' gameplay at other locations in the game environment. It will be appreciated that such video communication as described above could enable the spectator to help the player by demonstrating different tactical handling of situations/fights or using different pathways, etc.

In some implementations, communications between the player and spectator via the communication channel are private, in that other players or spectators are not privy to such communications. In other implementations, communications between the player and spectator helper via the communication channel are at least partially made public, in that other players or spectators are enabled to see/hear such communications. In some implementations, text communications between the player and spectator helper are displayed in a dedicated stream, separate from other communication streams such as the comments stream.

In some implementations, the helper mode enables a control visualization 808 to occur, whereby the spectator helper can demonstrate a control operation to the player that is visualized to the player via a graphical display of the control operation. For example, a graphical display of a controller (or input devices included therein, such as buttons, joysticks, etc.) is provided to the player, and the spectator helper, using a similar controller, can provide controller input activation sequences that are visualized to the player through the graphical display of the controller. For example, the spectator helper may perform a series of button presses or joystick maneuvers as a demonstration for the player, and these will be visualized on the graphical display of the controller. In this manner, the spectator can assist the player, not by performing any activity that would be directly reflected in the game itself, but by demonstrating a controller input sequence to the player, such as a particular button combination needed to overcome a given situation in the gameplay.

Figure 9:
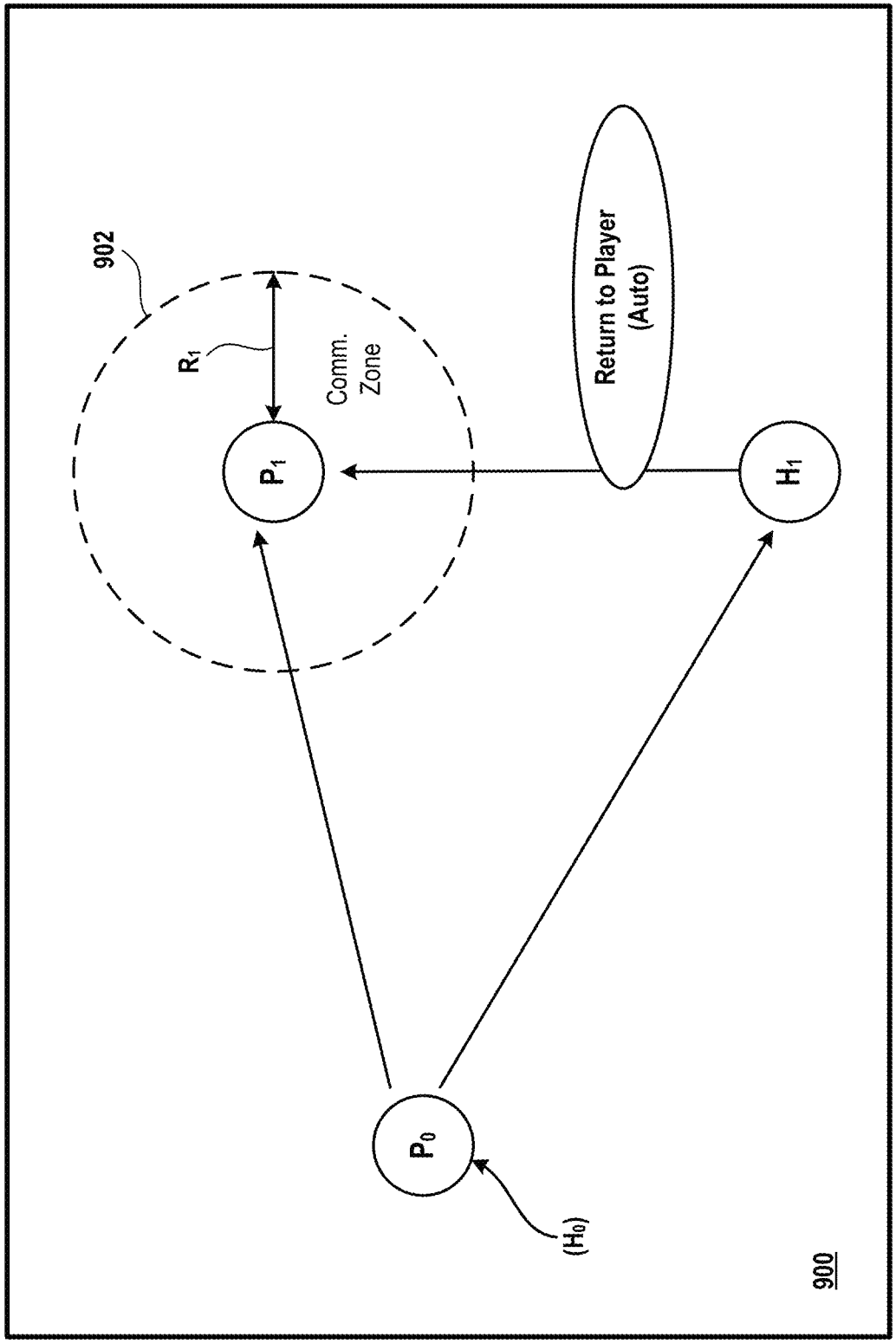
FIG. 9 conceptually illustrates a spectator helper provided with independent viewing of a gameplay virtual environment, in accordance with implementations of the disclosure.

FIG. 9 conceptually illustrates a spectator helper provided with independent viewing of a gameplay virtual environment, in accordance with implementations of the disclosure.

In some implementations, a spectator helper is able to not only view the player's gameplay as a regular spectator viewing the game stream of the player, but is also able to access independent viewing of the virtual environment and thereby obtain views of the virtual environment from a different view location/direction in the virtual environment than that of the player.

For example, in the illustrated implementation, at an initial time, a player has a view location P0 in a virtual environment 900. At this initial time, a spectator helper is viewing the player's game stream as a regular spectator would, such that the spectator helper's view location tracks that of the player, and thus the spectator helper has a view location H0 that is the same as P0. However, in the illustrated implementation, the spectator helper is able to diverge from the player to obtain independent views of the virtual environment from that of the player. Thus, at a subsequent time when the player's view location has moved to a view location P1, the spectator helper's view location moves to a view location H1 that is different from the location P1.

Accordingly, the spectator helper is now viewing the virtual environment 900 from a different perspective than the player.

While the above has been described with reference to the player and spectator helper view locations, it will be appreciated that similar concepts apply to the view directions as well.

In some implementations, in order for the spectator helper to be provided with independent viewing of the virtual environment, the cloud gaming system is configured to render an additional video stream for the spectator helper. Thus, when the spectator helper chooses to diverge from the player's view, such as by selecting a corresponding option through the spectator's interface, then this triggers initiation of rendering of the additional video stream for the spectator helper. It will be appreciated that the view provided to the spectator helper is now independently controlled by the spectator helper (e.g. through an input/controller device operated by the spectator helper), and more specifically, the spectator helper is controlling a separate virtual view location/direction than that of the player.

In some implementations, the spectator helper's ability to view is instantiated with properties similar to that of the player's character/avatar. That is, though the spectator helper is not controlling another character/avatar in the game, the spectator helper's viewing abilities are subject to similar limitations as that of another character similar to that of the player. For example, in some implementations, the player's character cannot move through walls or other objects in the virtual environment 900, and neither can the spectator helper move their view location through such walls or objects. In some implementations, the spectator helper's view is generated by instantiating a spectator entity type in the virtual environment that is invisible (e.g. exhibiting zero reflection and/or 100% transmission of light for rendering purposes when rendering player views or other spectator views), and subject to one-way collision/physics rules that affect the spectator entity, such as limiting movement of the spectator entity in the virtual environment, but do not affect other objects or characters in the virtual environment so that they are unaffected by the spectator entity's movements. In some implementations, the spectator entity is rendered in a visible manner, but only to the player or the spectator helper, so that other players and spectators cannot see the spectator entity.

It will be appreciated that by providing independent viewing to the spectator helper, the spectator helper is no longer connected to the player, but able to wander off to other areas of the game. For example, the spectator helper might explore areas that the player has not visited yet, and tell the player about such areas. Or the spectator helper might discover objects in different areas from the player, and report such findings to the player to help the player in their gameplay.

In some implementations, the spectator helper can communicate with the player regardless of their relative locations to each other. In other implementations, the spectator helper is required to be within a predefined proximity of the player in order to communicate with the player, such as being within a predefined distance of the player. For example, with reference to the illustrated implementation, the spectator helper may need to return to be within a communication zone 902 proximate to the player's location P1. In some implementations, the communication zone 902 is defined as a region within a radius R1 of the player's location.

In some implementations, a functionality is provided to enable the spectator helper to automatically return to the location of the player, or a location proximate to the player (e.g. adjacent to the player, proximately behind the player, etc.).

While implementations have been described in the context of a spectator helper providing assistance to a specific player, in some implementations, a spectator helper can simultaneously help two or more players. In some implementations, communications between the spectator helper and multiple players are shared amongst each other.

Figure 10:
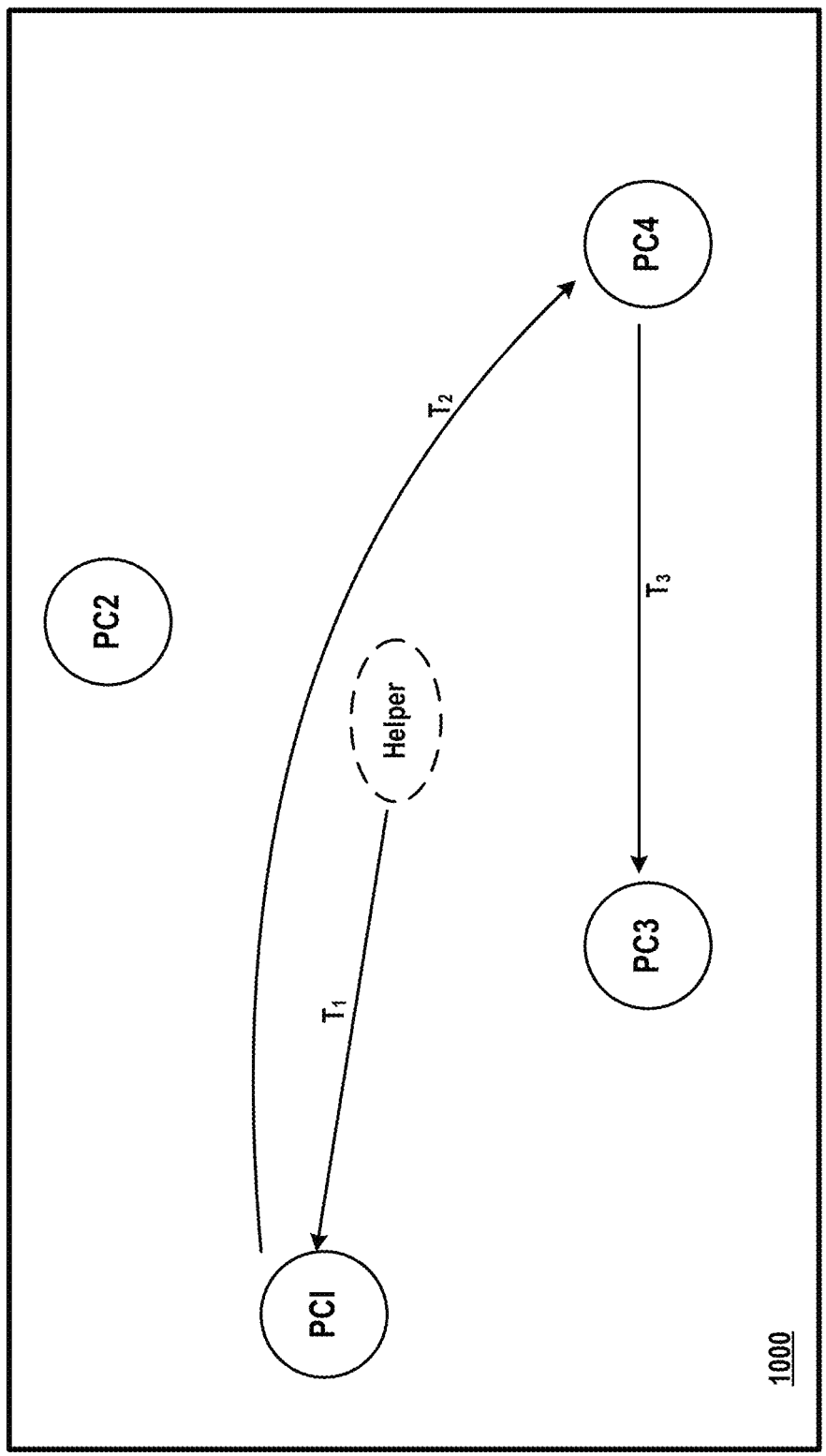
FIG. 10 conceptually illustrates a spectator helper moving to different players at different times to provide assistance within a virtual environment, in accordance with implementations of the disclosure.

FIG. 10 conceptually illustrates a spectator helper moving to different players at different times to provide assistance within a virtual environment, in accordance with implementations of the disclosure.

In the illustrated implementation, several players are engaged in gameplay of a video game in a virtual environment 1000, the several player respectively controlling, and represented by, player characters PC1, PC2, PC3, and PC4. A spectator helper is also engaged in providing assistance to the players. In order to increase the effectiveness of the spectator helper, in some implementations, the system directs or recommends the spectator helper to help a given one of the players at a given time during the gameplay. For example, in the illustrated implementation, an a time T1, the system directs or recommends the spectator helper to help the player character PC1; at a subsequent time T2, the system directs or recommends the spectator helper to help the player character PC4, and at a subsequent time T3, the system then directs or recommends the spectator helper to help the player character PC3.

In some implementations, the system directs (or recommends) the spectator helper to the player character that is determined to be in greatest need of assistance, for example, based on detection and quantifying an amount of difficulty being experienced by each of the players. Determining which player is most in need of assistance can be determined based on several factors, such as the number of points or other measures of achievement obtained by each of the players, the rates at which such points or achievements are being obtained during gameplay, an amount of recent movement or recent activity, an amount or rate of player deaths during the gameplay, etc. By directing the spectator helper to assist the players that are most in need, then the effectiveness of the spectator helper can be improved when assisting multiple players.

It will be appreciated that after the spectator helper assists a given player, then a different player may be in greater need of assistance, and thus the spectator helper can be directed to the next player. In this manner the spectator helper is continually challenged and less likely to become disinterested, and further able to maximize their impact on the gameplay by helping those that need it most.

In some implementations, in the case of competitive games between players/teams, having a spectator helper can confer an advantage to that player/team, and potentially make the gameplay less fair versus players/teams that do not have a spectator helper. Therefore, in order to promote fairness, in some implementations, the system is configured to recruit spectator helpers so as to balance out the players/teams. For example, if one player/team has a helper but others do not, then the system may automatically request spectators to join as helpers for the ones that do not have a spectator helper, or surface a suggestion to the players/teams that do not have a spectator helper to request spectators to join as helpers. It will be appreciated that the foregoing concept of balancing the spectator helpers amongst players/teams extends to balancing multiple spectator helpers per team or player.

In some implementations, in order to balance the provision of assistance to various players/teams, the system is configured to spawn AI bot helpers, which can be assigned to players or teams so as to balance out the distribution of helper entities. It will be appreciated that an AI bot helper can also be spawned for an individual player or team for the purposes of aiding in the gameplay, regardless of balancing of considerations. In some implementations, an AI helper model is trained based on the recorded activities of real spectator helpers in particular games and scenes, and such an AI helper model is used to govern the actions of the AI bot helper when deployed in-game. Accordingly, the AI bot helper can be configured and trained to perform the activities of a spectator helper as previously described.

While implementations of the present disclosure have been described in the context of video games, it will be appreciated that the principles of the present disclosure may be applied to other types of simulations or interactive applications. In some embodiments, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Implementations of the present disclosure can be utilized in the development of, or in conjunction with, or included as part of, a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 or Playstation® 5 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 11A:
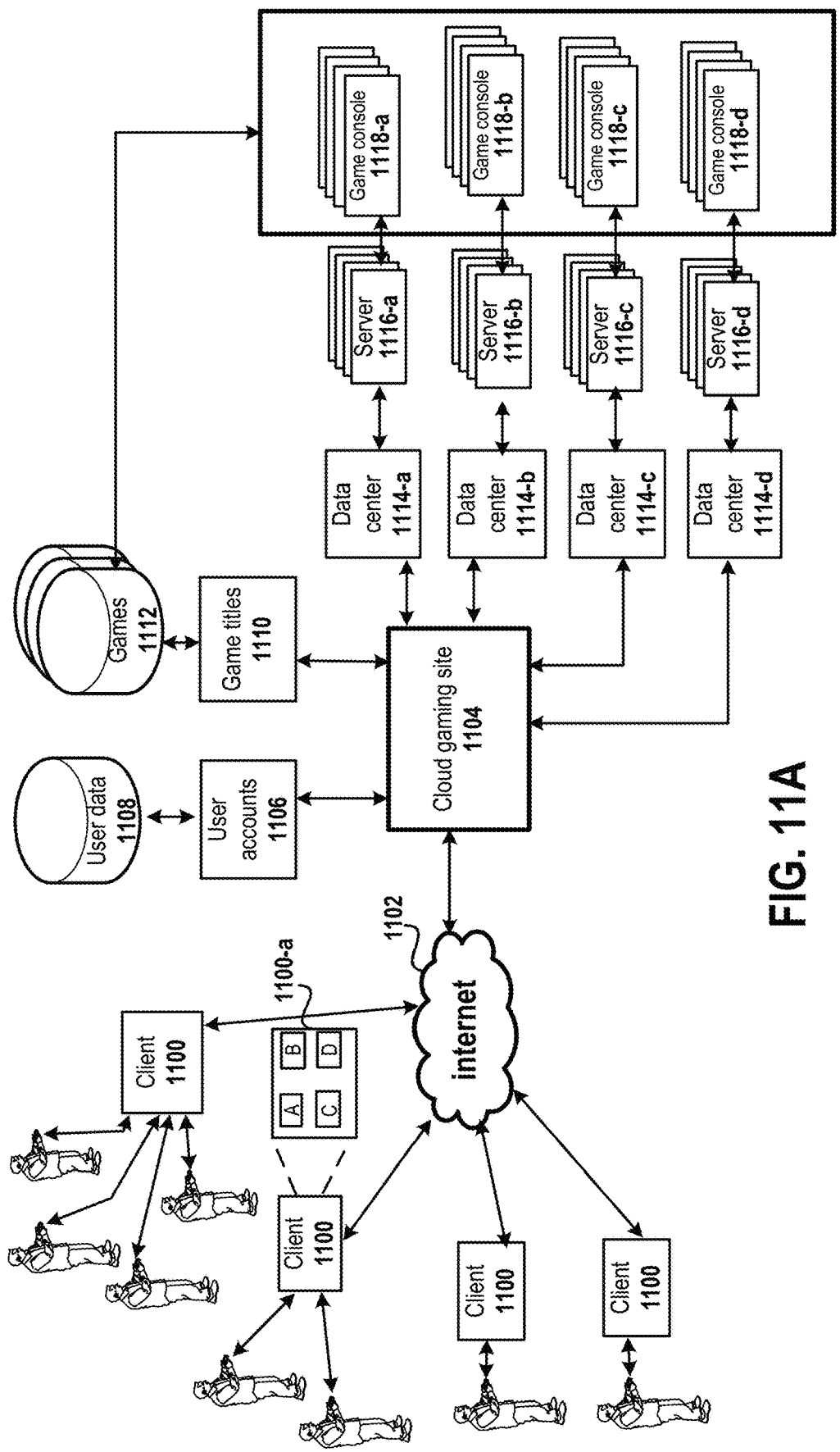
FIG. 11A illustrates an exemplary system used to load game files for a game available through a cloud gaming site, in accordance with implementations of the disclosure.

FIG. 11A illustrates an exemplary system used to load game files for a game available through a cloud gaming site, in accordance with implementations of the disclosure.

The system includes a plurality of client devices 1100 that are communicatively connected to the cloud gaming site 1104 over a network 1102, which can include a LAN, wired, wireless, cellular (e.g. 4G, 5G, etc.), or any other type of data network, including the Internet. When a request to access the cloud gaming site 1104 is received from a client device 1100, the cloud gaming site 1104 accesses user account information 1106 stored in a user data store 1108 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 1110 to identify the game titles that are available at the game cloud site for the user account initiating the request. The game titles data store 1110, in turn, interacts with a games database 1112 to obtain the game titles for all the games that are available for the cloud gaming site. As new games are introduced, the games database 1112 will be updated with the game code and the game titles data store 1110 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 1100-*a*, as shown in FIG. 11A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 11B:
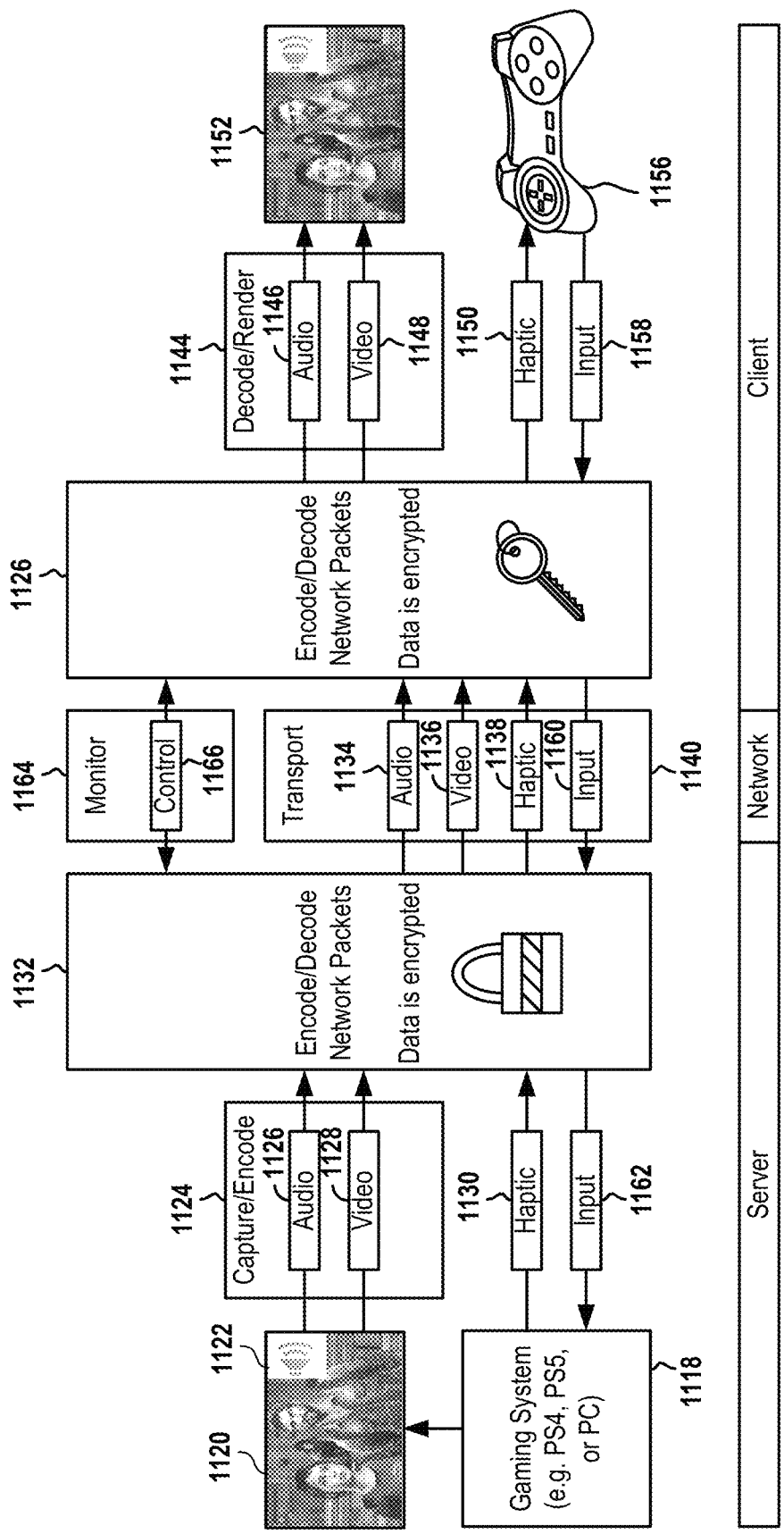
FIG. 11B is a flow diagram conceptually illustrating various operations which are performed for streaming a cloud video game to a client device, in accordance with implementations of the disclosure.

FIG. 11B is a flow diagram conceptually illustrating various operations which are performed for streaming a cloud video game to a client device, in accordance with implementations of the disclosure.

The gaming system 1118 executes a video game and generates raw (uncompressed) video 1120 and audio 1122. The video 1120 and audio 1122 are captured and encoded for streaming purposes, as indicated at reference 1124 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 1126 and encoded video 1128 are further packetized into network packets, as indicated at reference numeral 1132, for purposes of transmission over a network such as the Internet. The network packet encoding process can also employ a data encryption process, thereby providing enhanced data security. In the illustrated implementation, audio packets 1134 and video packets 1136 are generated for transport over the network, as indicated at reference 1140.

The gaming system 1118 additionally generates haptic feedback data 1130, which is also packetized into network packets for network transmission. In the illustrated implementation, haptic feedback packets 1138 are generated for transport over the network, as further indicated at reference 1140.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 1140, the audio, video, and haptic feedback packets are transported over a network, such as and/or including the Internet. As indicated at reference 1142, the audio packets 1134, video packets 1136, and haptic feedback packets 1138, are decoded/reassembled by the client device to define encoded audio 1146, encoded video 1148, and haptic feedback data 1150 at the client device. If the data has been encrypted, then the network packets are also decrypted. The encoded audio 1146 and encoded video 1148 are then decoded by the client device, as indicated at reference 1144, to generate client-side raw audio and video data for rendering on a display device 1152. The haptic feedback data 1150 can be processed/communicated to produce a haptic feedback effect at a controller device 1156 or other interface device through which haptic effects can be rendered. One example of a haptic effect is a vibration or rumble of the controller device 1156.

It will be appreciated that a video game is responsive to user inputs, and thus, a similar procedural flow to that described above for transmission and processing of user input, but in the reverse direction from client device to server, can be performed. As shown, a user operating controller device 1156 may generate input data 1158. This input data 1158 is packetized at the client device for transport over the network to the cloud gaming system. The input data packets 1160 are unpacked and reassembled by the cloud gaming server to define input data 1162 on the server-side. The input data 1162 is fed to the gaming system 1118, which processes the input data 1162 to update the game state of the video game.

During transport (ref. 1140) of the audio packets 1134, video packets 1136, and haptic feedback packets 1138, the transmission of data over the network can be monitored to ensure the cloud game stream quality of service. For example, network conditions can be monitored as indicated by reference 1164, including both upstream and downstream network bandwidth, and the game streaming can be adjusted in response to changes in available bandwidth. That is, the encoding and decoding of network packets can be controlled based on present network conditions, as indicated by reference 1166.

Figure 12:
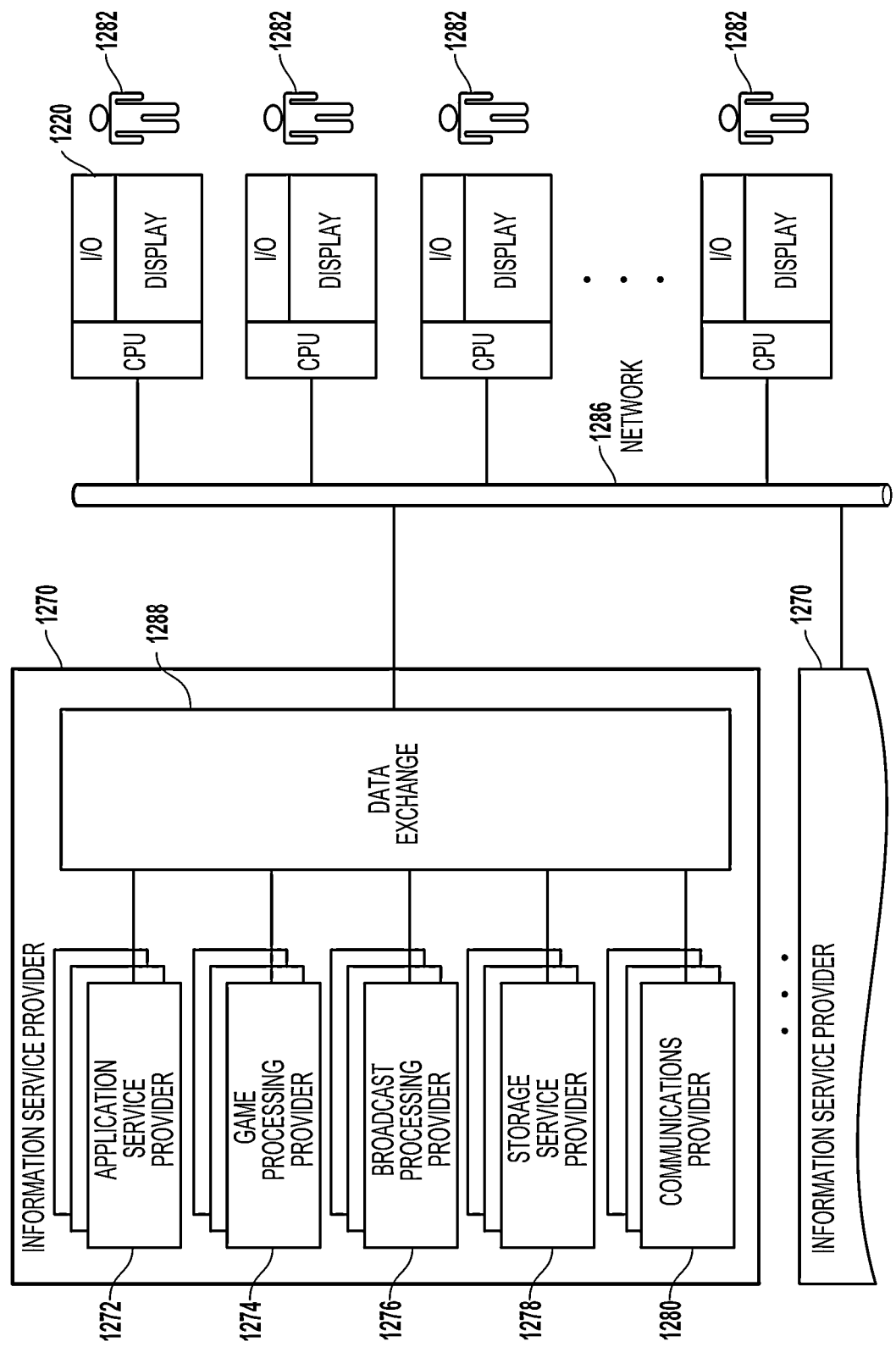
FIG. 12 illustrates an embodiment of an Information Service Provider architecture, in accordance with implementations of the disclosure.

FIG. 12 illustrates an embodiment of an Information Service Provider architecture, in accordance with implementations of the disclosure.

Information Service Providers (ISP) 1270 delivers a multitude of information services to users 1282 geographically dispersed and connected via network 1286. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1270 includes Application Service Provider (ASP) 1272, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1270 includes a Game Processing Server (GPS) 1274 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1276 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1278 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1280 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1288 interconnects the several modules inside ISP 1270 and connects these modules to users 1282 via network 1286. Data Exchange 1288 can cover a small area where all the modules of ISP 1270 are in close proximity, or can cover a large geographic area when the different modules are geographically dispersed. For example, Data Exchange 1288 can include a fast Gigabit Ethernet (or faster) within a cabinet of a data center, or an intercontinental virtual area network (VLAN).

Users 1282 access the remote services with client device 1284, which includes at least a CPU, a memory, a display and I/O. The client device can be a PC, a mobile phone, a netbook, tablet, gaming system, a PDA, etc. In one embodiment, ISP 1270 recognizes the type of device used by the client and adjusts the communication method employed. In other cases, client devices use a standard communications method, such as html, to access ISP 1270.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, performed by at least one server computer, for providing spectating of gameplay of a video game, comprising:

receiving a plurality of game streams, each game stream being generated from an executing session of a video game;

analyzing each game stream, to recognize gameplay activity depicted in each game stream;

obtaining spectating preferences of a user, wherein the spectating preferences of the user include preferences for one or more types of gameplay activity that are performed within a given genre of video games;

determining a prioritization of the plurality of game streams based on the recognized gameplay activity and the spectating preferences of the user;

providing, over a network via a client device operated by the user, a recommendation of at least some of the game streams for spectating based on the determined prioritization;

responsive to receiving, over the network from the client device, a selection of one of the recommended game streams, then providing, over the network to the client device, the selected game stream for spectating by the user;

monitoring the gameplay activity in the selected game stream;

responsive to detecting a predefined change in the gameplay activity in the selected game stream, then automatically switching the user from the selected game stream to a second selected game stream.

2. The method of claim 1, wherein each game stream includes gameplay video or gameplay metadata, generated from the executing session of the video game.

3. The method of claim 2, wherein analyzing each game stream includes applying a machine learning model to the gameplay video or gameplay metadata to recognize the gameplay activity.

4. The method of claim 1, wherein analyzing each game stream includes analyzing movements of players in a game virtual environment in each game stream.

5. The method of claim 1, wherein each session is executed by a cloud gaming system.

6. The method of claim 1, wherein the predefined change in the gameplay activity is defined by one or more of a reduction in activity levels, weapons firing, player movements, a number of participating players in the gameplay activity, or a number of spectators.

7. A method, performed by at least one server computer, for providing spectating of gameplay of a video game, comprising:
receiving a plurality of game streams, each game stream being generated from an executing session of a video game;
analyzing each game stream, to predict future gameplay activity in each game stream;
obtaining spectating preferences of a user, wherein the spectating preferences of the user include preferences for one or more types of gameplay activity that are performed within a given genre of video games;
determining a prioritization of the plurality of game streams based on the predicted future gameplay activity and the spectating preferences of the user;
providing, over a network via a client device operated by the user, a recommendation of at least some of the game streams for spectating based on the determined prioritization;
responsive to receiving, over the network from the client device, a selection of one of the recommended game streams, then providing, over the network to the client device, the selected game stream for spectating by the user;
monitoring the gameplay activity in the selected game stream;
responsive to detecting a predefined change in the gameplay activity in the selected game stream, then automatically switching the user from the selected game stream to a second selected game stream.

8. The method of claim 7, wherein each game stream includes gameplay video or gameplay metadata, generated from the executing session of the video game.

9. The method of claim 8, wherein analyzing each game stream includes applying a machine learning model to the gameplay video or gameplay metadata to predict the future gameplay activity.

10. The method of claim 7, wherein analyzing each game stream includes analyzing movements of players in a game virtual environment in each game stream.

11. The method of claim 7, wherein each session is executed by a cloud gaming system.

12. The method of claim 7, wherein providing the selected game stream enables spectating by the user to begin prior to the predicted future gameplay activity occurring.

13. The method of claim 7, wherein the predefined change in the gameplay activity is defined by one or more of a reduction in activity levels, weapons firing, player movements, a number of participating players in the gameplay activity, or a number of spectators.

14. A non-transitory computer readable medium having program instructions embodied thereon that, when performed by at least one server computer, cause said at least one server computer to perform a method for providing spectating of gameplay of a video game, said method comprising:
receiving a plurality of game streams, each game stream being generated from an executing session of a video game;
analyzing each game stream, to recognize gameplay activity depicted in each game stream;
obtaining spectating preferences of a user, wherein the spectating preferences of the user include preferences for one or more types of gameplay activity that are performed within a given genre of video games;
determining a prioritization of the plurality of game streams based on the recognized gameplay activity and the spectating preferences of the user;
providing, over a network via a client device operated by the user, a recommendation of at least some of the game streams for spectating based on the determined prioritization;
responsive to receiving, over the network from the client device, a selection of one of the recommended game streams, then providing, over the network to the client device, the selected game stream for spectating by the user;
monitoring the gameplay activity in the selected game stream;
responsive to detecting a predefined change in the gameplay activity in the selected game stream, then automatically switching the user from the selected game stream to a second selected game stream.

15. The non-transitory computer readable medium of claim 14, wherein each game stream includes gameplay video or gameplay metadata, generated from the executing session of the video game.

16. The non-transitory computer readable medium of claim 15, wherein analyzing each game stream includes applying a machine learning model to the gameplay video or gameplay metadata to recognize the gameplay activity.

17. The non-transitory computer readable medium of claim 14, wherein analyzing each game stream includes analyzing movements of players in a game virtual environment in each game stream.

18. The non-transitory computer readable medium of claim 14, wherein each session is executed by a cloud gaming system.

19. The non-transitory computer readable medium of claim 14, wherein the predefined change in the gameplay activity is defined by one or more of a reduction in activity levels, weapons firing, player movements, a number of participating players in the gameplay activity, or a number of spectators.

* * * * *